US009695050B2

(12) United States Patent
Lake et al.

(10) Patent No.: US 9,695,050 B2
(45) Date of Patent: Jul. 4, 2017

(54) METHODS AND SYSTEMS USING ELECTROCHEMICAL CELLS FOR PROCESSING METAL SULFATE COMPOUNDS FROM MINE WASTE AND SEQUESTERING $CO_2$

(71) Applicant: Strategic Metals Ltd., Vancouver (CA)

(72) Inventors: Donald Lake, Vancouver (CA); Lee Groat, West Vancouver (CA); Andrew Carne, Vancouver (CA); William Douglas Eaton, North Vancouver (CA)

(73) Assignee: Terra CO2 Technologies Ltd., Vancouver (CA)

( * ) Notice: Subject to any disclaimer, the term of this patent is extended or adjusted under 35 U.S.C. 154(b) by 0 days.

(21) Appl. No.: 15/069,877

(22) Filed: Mar. 14, 2016

(65) Prior Publication Data

US 2016/0194208 A1    Jul. 7, 2016

Related U.S. Application Data

(63) Continuation-in-part of application No. 14/071,252, filed on Nov. 4, 2013, now Pat. No. 9,284,621.
(Continued)

(51) Int. Cl.
*C01B 31/24* (2006.01)
*C01G 49/00* (2006.01)
(Continued)

(52) U.S. Cl.
CPC .............. *C01B 31/24* (2013.01); *B01D 53/62* (2013.01); *B01D 53/73* (2013.01); *B09B 3/00* (2013.01);
(Continued)

(58) Field of Classification Search
CPC ...... C01B 31/24; Y02P 20/152; Y02P 10/214; Y02P 10/234; C01G 49/00; Y02C 10/04;
(Continued)

(56) References Cited

U.S. PATENT DOCUMENTS 3,109,732 A    11/1963    Goren
3,531,386 A     9/1970    Heredy
(Continued)

FOREIGN PATENT DOCUMENTS

CN      102059038 A       5/2011
DE    102009041143 A1 *   3/2011    ................ C02F 9/00
(Continued)

OTHER PUBLICATIONS

Anonymous, "Sulphate and salt minerals: the problem of treating mine waste," *Mining Environmental Management*, May 2000, pp. 11-13.
(Continued)

*Primary Examiner* — Timothy Vanoy
(74) *Attorney, Agent, or Firm* — Morgan, Lewis & Bockius LLP

(57) ABSTRACT

Systems and methods are provided for processing metal sulfate compounds and sequestering $CO_2$. These systems and processes involve one or more electrochemical cells for producing an alkali-containing catholyte and involve a $CO_2$ absorption reactor operatively connected to the electrochemical cell and to a $CO_2$ source. The $CO_2$ absorption reactor receives the alkali-containing catholyte and $CO_2$ gas for forming an alkaline carbonate solution. The alkaline carbonate solution is directed to a vessel where it reacts with an acidic sulfate solution comprising metal ions resulting in precipitation of solid metal carbonate compounds. The acidic sulfate solution may comprise sulfide leachates from acid mine drainage, sulfide mine tailings and/or reacted pyrite concentrate. The acidic sulfate solution may be circulated through an optional $SO_2$ reduction reactor prior to reaction in the vessel. The $SO_2$ reduction reactor reduces trivalent metal compounds present in the acidic sulfate solution to divalent metal compounds.

25 Claims, 13 Drawing Sheets

Related U.S. Application Data

(60) Provisional application No. 61/722,053, filed on Nov. 2, 2012, provisional application No. 62/307,681, filed on Mar. 14, 2016.

(51) Int. Cl.
| | |
|---|---|
| *C01D 7/00* | (2006.01) |
| *C01G 21/14* | (2006.01) |
| *C02F 1/46* | (2006.01) |
| *C02F 9/06* | (2006.01) |
| *C01G 9/00* | (2006.01) |
| *B01D 53/62* | (2006.01) |
| *B01D 53/73* | (2006.01) |
| *B09B 3/00* | (2006.01) |
| *B09B 5/00* | (2006.01) |
| *C22B 3/02* | (2006.01) |
| *C22B 7/00* | (2006.01) |
| *C22B 13/02* | (2006.01) |
| *C22B 15/00* | (2006.01) |
| *C22B 19/20* | (2006.01) |
| *C22B 3/20* | (2006.01) |

(52) U.S. Cl.
CPC ............... *B09B 5/00* (2013.01); *C01D 7/00* (2013.01); *C01G 9/00* (2013.01); *C01G 21/14* (2013.01); *C01G 49/00* (2013.01); *C22B 3/02* (2013.01); *C22B 3/20* (2013.01); *C22B 7/006* (2013.01); *C22B 13/025* (2013.01); *C22B 15/00* (2013.01); *C22B 19/20* (2013.01); *B01D 2257/302* (2013.01); *B01D 2257/504* (2013.01); *B01D 2258/0283* (2013.01); *Y02C 10/04* (2013.01); *Y02P 10/214* (2015.11); *Y02P 10/234* (2015.11); *Y02P 20/152* (2015.11); *Y02W 30/20* (2015.05)

(58) Field of Classification Search
CPC .. B01D 53/62; B01D 53/73; B01D 2257/504; B01D 2258/0283; B09B 3/00; B09B 5/00; C22B 3/02; C22B 7/006; C22B 3/20; Y02W 30/20; E21C 41/32; C02F 2103/06; C02F 2103/10; C02F 1/46
See application file for complete search history.

(56) References Cited

U.S. PATENT DOCUMENTS

| | | | |
|---|---|---|---|
| 3,801,698 A | 4/1974 | Lowrance et al. | |
| 4,561,948 A * | 12/1985 | Stiller .................. | C02F 1/46114 204/248 |
| 4,721,526 A | 1/1988 | Elmore et al. | |
| 4,950,409 A | 8/1990 | Stanford | |
| 5,630,934 A * | 5/1997 | Chesworth .............. | B09C 1/085 205/724 |
| 6,991,405 B2 | 1/2006 | Barrie et al. | |
| 7,727,374 B2 * | 6/2010 | Jones ................. | B01D 53/1418 204/194 |
| 7,771,684 B2 | 8/2010 | Constantz et al. | |
| 7,919,064 B2 | 4/2011 | Kawatra et al. | |
| 8,840,793 B2 | 9/2014 | Bratty et al. | |
| 9,284,621 B2 * | 3/2016 | Eaton ....................... | B09B 3/00 |
| 2003/0132166 A1 | 7/2003 | Rey | |
| 2007/0031311 A1 | 2/2007 | Anthony et al. | |
| 2009/0081095 A1 | 3/2009 | Wasas | |
| 2010/0140103 A1 | 6/2010 | Gilliam et al. | |
| 2010/0200419 A1 | 8/2010 | Gilliam et al. | |
| 2010/0282686 A1 | 11/2010 | Sharkey, Jr. et al. | |
| 2011/0035154 A1 | 2/2011 | Kendall et al. | |
| 2011/0083968 A1 | 4/2011 | Gilliam et al. | |
| 2011/0089045 A1 | 4/2011 | Cardarelli | |
| 2011/0158873 A1 | 6/2011 | Riman et al. | |
| 2011/0300045 A1 | 12/2011 | Jang et al. | |
| 2012/0031303 A1 | 2/2012 | Constantz et al. | |
| 2012/0193296 A1 | 8/2012 | Bhaduri et al. | |
| 2013/0008354 A1 | 1/2013 | Constanz et al. | |
| 2013/0034489 A1 | 2/2013 | Gilliam et al. | |
| 2014/0007795 A1 | 1/2014 | Moffett et al. | |
| 2014/0034575 A1 | 2/2014 | Bratty et al. | |
| 2014/0251914 A1 | 9/2014 | Ball et al. | |
| 2016/0244344 A1 * | 8/2016 | Park .................... | C02F 1/46104 |

FOREIGN PATENT DOCUMENTS

| | | | |
|---|---|---|---|
| EP | 1 987 896 A2 | 11/2008 | |
| GB | 126 951 A | 1/1920 | |
| GB | 126951 | 1/1920 | |
| IN | 134884 | 11/1919 | |
| KR | 20160104141 A * | 9/2016 | .......... C02F 1/46104 |
| WO | WO 2007/024218 A1 | 3/2007 | |
| WO | WO 2010/008896 A1 | 1/2010 | |
| WO | WO 2011/047070 A1 | 4/2011 | |
| WO | WO 2015/058287 A1 | 4/2015 | |
| WO | WO 2015150636 A1 * | 10/2015 | ......... B01D 21/2438 |

OTHER PUBLICATIONS

Bénézeth, P. et al., "Solubility product of siderite ($FeCO_3$) as a function of temperature (25-250° C.)," *Chemical Geology*, 2009, vol. 268, pp. 3-12.

Bigham, J.M. et al., "Iron and Aluminum Hydroxysulfates from Acid Sulfate Waters," *Reviews in Mineralogy and Geochemisty*, 2000, vol. 40, pp. 351-403.

Chokshi, K. et al., "Iron Carbonate Scale Growth and the Effect of Inhibition in $CO_2$ Corrosion of Mild Steel," *Proceedings of the NACE Corrosion/2005 Conference* Houston, USA, Paper 05285, 2005, pp. 1-23.

Fowler, T.A. et al., "Mechanism of Pyrite Dissolution in the Presence of *Thiobacillus ferrooxidans,*" *Applied and Environmental Microbiology*, Jul. 1999, vol. 65, No. 7, pp. 2987-2993.

Goldberg, P. et al., "$CO_2$ Mineral Sequestration Studies in US," *Proceedings of the First National Conference on Carbon Sequestration*, May 14-17, 2011, Washington, DC, pp. 1-10.

Hangx, S.J.T., "Subsurface mineralisation: Rate of $CO_2$ mineralisation and geomechanical effects on host and seal formations; Behaviour of the $CO_2$—$H_2O$ system and preliminary mineralisation model and experiments," *CATO Workpackage WP 4.1*, 2005, pp. 1-43.

Holzheid, A. et al., "Iron sulfide stoichiometry as a monitor of sulfur fugacity in gas-mixing experiments," *American Mineralogist*, 2013, vol. 98, pp. 1487-1496.

Hu, G. et al., "Decomposition and oxidation of pyrite," *Progress in Energy and Combustion Science*, 2006, vol. 32, pp. 295-314.

International Search Report mailed May 3, 2012, for International Patent Application No. PCT/CA2012/000045, 4 pages.

Kharaka, Y.K. et al., "Gas-water-rock interactions in sedimentary basins: $CO_2$ sequestration in the Frio Formation, Texas, USA," *Journal of Geochemical Exploration*, 2006, vol. 89, pp. 183-186.

Laajalehto, K. et al., "STM and XPS investigation of reaction of galena in air," *Applied Surface Science*, 1993, vol. 64, pp. 29-39.

Murphy, R. et al., "Ferrihydrite phase transformation in the presence of aqueous sulfide and supercritical $CO_2$," *Chemical Geology*, 2010, vol. 271, pp. 26-30.

Murphy, R. et al., "Hematite reactivity with supercritical $CO_2$ and aqueous sulfide," *Chemical Geology*, 2011, vol. 283, pp. 210-217.

Nafday, O.A. et al., "Iron Carbonate Scale Formation and $CO_2$ Corrosion in the Presence of Acetic Acid, Paper No. 05295," *Proceedings of the NACE Corrosion/2005 Conference*, Houston, USA, pp. 1-27.

Palandri, J.L. et al., "Reconstruction of in situ composition of sedimentary formation waters," *Geochimica et Cosmoschimica Acta*, 2001, vol. 65, No. 11, pp. 1741-1767.

Palandri, J.L. et al., "Experimental Studies of $CO_2$ Sequestration in Ferric Iron-Bearing Sediments: $CO_2$—$SO_2$ Reaction with Hematite," 2004, USGS, Menlo Park, CA, USA, pp. 1-10.

(56) References Cited

OTHER PUBLICATIONS

Palandri, J.L. et al., "Ferric iron in sediments as a novel $CO_2$ mineral trap: $CO_2$—$SO_2$ reaction with hematite," *Applied Geochemistry*, 2005, vol. 20, pp. 2038-2048.

Palandri, J.L. et al., "Ferric iron-bearing sediments as a mineral trap for $CO_2$ sequestration: Iron reduction using sulfur-bearing waste gas," *Chemical Geology*, 2005, vol. 217, pp. 351-364.

Rimstidt, J.D. et al., "Pyrite oxidation: A state-of-the-art assessment of the reaction mechanism," *Geochimica et Cosmochimica Acta*, vol. 67, pp. 873-880.

Roh, Y. et al., "Biogeochimical and Environmental Factors in Fe Biomineralization: Magnetite and Siderite Formation," *Clays and Clay Minerals*, 2003, vol. 51, No. 1, pp. 83-95.

Spigarelli, B.P. et al., "Increased carbon dioxide absorption rates in carbonate solutions through surfactant addition," *Minerals & Metalurigcal Processing*, May 2013, vol. 30, No. 2, pp. 95-99.

Sun, W. et al., "A Study of Protective Iron Carbonate Scale Formation in $CO_2$ Corrosion," *Proceedings of AIChE Annual Meeting*, Nov. 7-12, 2004, 9 pages.

Sun, W. et al., "Basics Revisited: Kinetics of Iron Carbonate Scale Precipitation in $CO_2$ Corrosion, Paper No. 06365," *Proceedings of the NACE Corrosion/2006 Conference*, Houston, USA, pp. 1-21.

\* cited by examiner

METHODS AND SYSTEMS USING ELECTROCHEMICAL CELLS FOR PROCESSING METAL SULFATE COMPOUNDS FROM MINE WASTE AND SEQUESTERING $CO_2$

CROSS REFERENCE TO RELATED APPLICATION

This application is a Continuation-in-Part of U.S. patent application Ser. No. 14/071,252 filed on Nov. 4, 2013 (now U.S. Pat. No. 9,284,621), claiming priority to U.S. Provisional Patent Application No. 61/722,053, filed Nov. 2, 2012, the contents of which are hereby incorporated by reference herein in their entirety.

This application also incorporates by reference herein in its entirety and claims priority to U.S. Provisional Patent Application No. 62/307,681 filed Mar. 14, 2016, entitled "Electrolytic cells and uses thereof for the treatment of acid mine drainage and for sequestering $CO_2$".

TECHNICAL FIELD

This invention relates to the field of processing mine waste and recovery of valued products.

BACKGROUND

Mining is an essential industry, producing many valuable commodities that form the basis of the world economy, but with a history of negative environmental consequences. Mine waste streams from projects with sulfide ores are particularly detrimental, as both unprocessed waste rock and processed tailings material typically contain significant amounts of unoxidized or partially oxidized sulfide minerals. These minerals, over time, will react with water and atmospheric oxygen to create sulfuric acid and dissolved metals, a problem known as Acid Rock Drainage or Acid Mine Drainage. This can contaminate waterways and groundwater, leaving a long-term environmental problem.

Acid Rock Drainage (ARD) from mine waste rock, tailings, and mine structures such as open pits and underground workings is primarily a function of the mineralogy and permeability of the rock material and, as noted above, the availability of water and oxygen. ARD occurs naturally and as consequence of various mine activities. ARD, within this context of mining activity, may be referred to as Acid Mine Drainage (AMD), a subset of ARD.

Within a mine site, as field conditions during operation and long term storage are highly variable and difficult to assess in advance, predicting the potential for ARD is currently challenging, expensive, and of questionable reliability. ARD from mining operations is a costly problem and one in which both mine operators and governments alike are seeking solutions. In addition to the acid contribution to surface waters, ARD may cause metals such as arsenic, cadmium, copper, lead, mercury, and zinc to leach from mine wastes. This metal load causes environmental damage, and may be of greater concern than the acidity in environmental terms. Despite rigorous engineering and design, impoundment and treatment of acidic metal-bearing waters and/or sulfide-bearing materials can be compromised by human error, mechanical breakdowns, unrecognized geological features or extreme weather events.

Wastes that have the potential to generate acid as a result of mining activity include mined material such as tailings, waste rock piles or dumps, and spent ore from heap leach operations. While not mined wastes, pit walls of surface mining operations, mineralized areas left in underground mines and stockpiled ore also have the potential to generate ARD.

Simply put, acid is generated when metal sulfide minerals are oxidized. Metal sulfide minerals are present in ore bodies and surrounding host rocks at many mines and un-mined mineral prospects. Oxidation of these minerals and the formation of sulfuric acid occurs through natural weathering processes, however the oxidation rates of undisturbed ore bodies and release of acid and mobilization of metals is usually slow due to low permeability and natural buffering reactions. Thus, discharge from such undisturbed deposits poses limited threat to receiving aquatic ecosystems, which have usually adapted to the naturally elevated levels of ARD components if present.

Extraction operations associated with mining activity can greatly increase the rate of these oxidation reactions by exposing large volumes of sulfide-bearing rock material, with increased surface area, to air and water. The oxidation of sulfide minerals consists of numerous reactions and each type of sulfide mineral has a different oxidation rate. For example, pyrrhotite, marcasite and framboidal pyrite will oxidize quickly while crystalline pyrite will usually oxidize more slowly. Common sulfide minerals are identified in Table 1.

TABLE 1

Partial List of Sulfide Minerals (Ferguson and Erickson, 1988)

| Mineral | Composition |
|---|---|
| Pyrite | $FeS_2$ |
| Marcasite | $FeS_2$ |
| Chalcopyrite | $CuFeS_2$ |
| Chalcocite | $Cu_2S$ |
| Sphalerite | $ZnS$ |
| Galena | $PbS$ |
| Millerite | $NiS$ |
| Pyrrhotite | $Fe_{1-x}S$ (where $0 < x < 0.2$) |
| Arsenopyrite | $FeAsS$ |
| Cinnabar | $HgS$ |

The primary factors governing acid generation include the particular sulfide minerals present, moisture content, oxygen levels, permeability, ambient temperature, concentration of ferric iron, and in some cases the presence of bacteria which can catalyze the oxidation reactions. Also important is the physical occurrence/type of sulfide mineral. Large, well crystallized (euhedral) minerals have smaller exposed surface areas than a similar volume of irregularly shaped, finer grained minerals, and thus react less rapidly.

Furthermore, as ARD contains sulphuric acid, the pH of the contaminated runoff, (runoff that stems from contact between sulphide minerals and exposure to air and water) continues to decrease with ongoing sulphide oxidation. Under these low pH conditions, ferric sulphate may be oxidized to ferric iron, which is capable of oxidizing other minerals such as lead, copper, zinc or cadmium sulphides. As a result, ARD frequently contains high concentrations of toxic dissolved metals.

It is clear that both water and oxygen are necessary to generate acid drainage. Water serves as both a reactant and a mechanism for transporting oxygen and aqueous products. A ready supply of atmospheric oxygen is required to drive the oxidation reaction.

Mitigation of ARD is often performed by immersing waste products in water, or capping them with an impermeable layer, both of which are intended to prevent oxygen from reaching the reactive materials. These methods are expensive, and require on-going maintenance and oversight for decades after a project ceases operation. The risk of long-term environmental damage and cost of a decommissioning project can be greatly decreased by a process which more rapidly converts all or most of the sulfide minerals to chemically stable forms. There is a need for a better, more efficient and more economical process.

Active mine projects are also significant consumers of electricity, with beneficiation processes in particular being energy intensive, and they often require heat for buildings or processing steps. Many former mine sites are still connected to electrical grids by under-utilized transmission lines. In many regions there is not enough existing generating capacity to supply electrical power demand of mines and grids to which they are connected, and new thermal power plants are planned to satisfy this demand. Power and heating plants often burn hydrocarbons such as coal, oil, or natural gas, which produce emissions that contain significant amounts of $CO_2$, a known greenhouse gas. $CO_2$ sequestration, a process by which $CO_2$ is locked away in a form which removes it from the atmosphere, is becoming increasingly important as governments world-wide become concerned about climate change.

The Faro Mine in Yukon, Canada, is one example of a site left in an environmentally unsound state when the operator went bankrupt. This project is currently being decommissioned and is expected to cost the Canadian Federal government over $700M to clean-up over a period of 25 years. The Faro clean-up includes capping all reactive waste under impermeable covers which will prevent oxygen from reaching it. If these covers are ever damaged, the material will begin to react again. A means to accelerate this process in a controlled environment would be hugely beneficial.

Accordingly there is a need across varying mining industries, for a treatment system, in particular one that is adaptable to in situ operation and wherein sulfide-rich waste is treated to reduce environmental impacts including ARD and wherein valuable reaction products are also obtained.

There is also a need for effective remedial strategies that target the production of environmentally stable solid metal carbonate compounds from mine wastes comprising metal-rich sulfate compounds, often with sulfuric acid present.

There is also a need for electrochemical processes and electrolytic cells that can be used in conjunction with sequestration of carbon dioxide.

The present invention addresses these needs and other needs as it will be apparent from review of the disclosure and description of the features of the invention hereinafter.

SUMMARY OF THE INVENTION

The invention provides, in one aspect, a means to process sulfate and/or sulfide-rich mine and industrial waste using a $CO_2$-enriched gas mixture, therein to eliminate or reduce the waste's ARD and/or metal leaching properties and concomitantly to produce carbonate minerals which sequester $CO_2$.

In another aspect, there is provided a process for stabilizing a sulfate and/or sulfide-rich waste material (comprising metal sulfide minerals) which comprises exposing the waste material to a $CO_2$-enriched gas mixture, reacting the $CO_2$-enriched gas mixture with the metal sulfide minerals and forming a $CO_2$-depleted gas mixture, a carbonate-containing compound and at least one product selected from the group consisting of a purified metal (or a metal-rich compound suitable for smelting or refining), sulfuric acid, sulfur, hydrogen sulfide, sulfur dioxide, sulfur trioxide and sulfurous acid.

In another aspect, the process of the present invention comprises: (a) contacting a sulfate and/or sulfide-rich waste with a $CO_2$-enriched gas mixture in a reaction zone to produce reaction mixture; (b) recovering from the reaction mixture metal by-products; and (c) separating and recovering sulfuric acid, sulfurous acid, hydrogen sulfide, sulfur dioxide, sulfur trioxide and/or elemental sulfur from the reaction mixture.

The present invention provides, in another aspect, an apparatus for processing sulfate and/or sulfide-rich mine and industrial waste that includes: (a) a reaction zone comprising mine or industrial waste wherein the waste comprises at least one of uncrushed, crushed or ground waste rock, dry tailings, wet tailings, or other materials rich in sulfide minerals; (b) a feed line into the reaction zone, for delivery of a $CO_2$-enriched gas mixture; (c) a feed line for water and other reactants; and (d) means to separate solid and liquid reacted products.

The present invention provides, in another aspect, a processing system for stabilizing a sulfate and/or sulfide-rich waste material (comprising metal sulfide minerals) comprising: a supply of at least some carbon dioxide emissions from a carbon dioxide source; said supply configured to contain at least some of said carbon dioxide emissions from said carbon dioxide source; at least one processing reactor configured to receive said at least some of said carbon dioxide emissions from said carbon dioxide source; said reactor also receiving mine or industrial waste wherein the waste comprises at least one of uncrushed, crushed or ground waste rock, dry tailings, wet tailings, or other materials rich in sulfide minerals.

The present invention also provides a method for treating ARD which comprises the steps of a) contacting a source of the ARD with a $CO_2$-enriched gas mixture in a reaction zone to produce reaction mixture; (b) recovering from the reaction mixture metal by-products; and (c) separating and recovering sulfuric acid, sulfurous acid, hydrogen sulfide, sulfur dioxide, sulfur trioxide and/or elemental sulfur from the reaction mixture.

This process effectively: (a) treats unreacted sulfate and sulfide-rich mine and industrial waste materials, (b) reduces or eliminates the ARD potential of unreacted sulfate and sulfide-rich waste materials, (c) reduces or eliminates the metal leaching potential of unreacted sulfate and sulfide-rich waste materials, (d) produces valuable metal products, (e) consumes $CO_2$ from a power plant, lime kiln, cement plant or other $CO_2$ emitting source, (f) sequesters $CO_2$ in the form of chemically stable carbonate minerals, (g) improves the environmental performance of a mine or industrial site, (h) improves the environmental performance of a hydrocarbon-fueled electrical power generation facility, heating plant, lime kiln, cement plant or other $CO_2$-generating industrial process, (i) allows for cleanup of historical non-operating mine or industrial sites, (j) produces valuable concentrated sulfuric or sulfurous acid, (k) collects and removes gaseous hydrogen sulfide, sulfur dioxide and/or sulfur trioxide for conversion to valuable concentrated sulfuric or sulfurous acid or elemental sulfur (I) produces valuable elemental sulfur, and (m) produces valuable metals or metal-rich compounds, or any combination thereof.

In sum, the process of the invention converts all or substantially all of the reactive sulfide minerals (also referred to herein as metal sulfide minerals) to chemically stable forms while at the same time sequesters $CO_2$. The uses on various wastes are beneficial and extensive. For example, accelerated reaction of waste material stored in tailings dams and waste piles using $CO_2$-enriched gases to produce inert material is a highly desirable environmental solution.

An ancillary yet key aspect of the process is that the $CO_2$-enriched gas mixture used for conversion of the sulfide minerals may be used directly from hydrocarbon burning operations or other $CO_2$-producing industrial processes, thereby significantly reducing the greenhouse gas emissions of such operations.

Additional aspects of the invention involve the use of electrochemical cells in connection with environmental remediation and more particularly in connection with treatment of acid mine drainage and sequestration of carbon dioxide.

According to a particular aspect, the invention relates to a system for processing metal sulfate compounds and sequestering $CO_2$. In one embodiment, the system comprises:
  an electrochemical cell producing an alkali-containing catholyte;
  a $CO_2$ absorption reactor operatively connected to said electrochemical cell and to a source of $CO_2$, said $CO_2$ absorption reactor receiving said alkali-containing catholyte and said $CO_2$ for forming an alkaline carbonate solution; and
  a vessel for receiving an acidic solution containing metal sulfate compounds and for receiving said alkaline carbonate solution, said vessel allowing precipitation of solid metal carbonate compounds.

According to a related aspect, the invention relates to a method for processing aqueous metal sulfate compounds and sequestering $CO_2$. In one embodiment, the method comprises:
  providing an electrochemical cell producing an alkali-containing catholyte;
  providing a $CO_2$ absorption reactor operatively connected to said electrochemical cell and to a source of $CO_2$;
  feeding said $CO_2$ absorption reactor with said alkali-containing catholyte for forming an alkaline carbonate solution; and
  reacting in a vessel an acidic sulfate solution comprising metal ions with said alkaline carbonate solution for precipitating solid metal carbonate compounds.

In embodiments, the alkaline carbonate compound solution comprises at least one of carbonate ions, sodium carbonate, sodium bicarbonate, potassium carbonate, calcium carbonate and mixtures thereof. In embodiments, the carbonate compounds are produced by reacting said alkali-containing catholyte with $CO_2$ gas circulating inside the $CO_2$ absorption reactor. In embodiments, the source of $CO_2$ is a $CO_2$-enriched gas mixture.

In embodiments, the acidic sulfate solution comprises sulfate compounds containing divalent metal cations and the precipitated solid metal carbonate compounds comprise carbonate compounds containing divalent metal.

In embodiments, the acidic sulfate solution comprises sulfide leachates from acid mine drainage, sulfide mine tailings and/or reacted pyrite concentrate. In embodiments, the sulfide leachates have a pH of about 1 to about 3.

In embodiments, the acidic sulfate solution comprises at least one of $FeSO_4$, and $Fe(OH)_3$, and the solid metal carbonate compound comprises iron carbonate.

In embodiments, the electrochemical cell is selected from the group consisting of brine electrolytic cells, bipolar membrane electrodialytic (BMED) cells and electro-electrodialytic (EED) cells.

In embodiments, the methods further comprise recovering said solid metal carbonate compounds.

In embodiments, the methods further comprise a step of circulating the acidic sulfate solution through a $SO_2$ reduction reactor prior to said reacting, wherein said $SO_2$ reduction reactor reduces trivalent metal compounds present in the acidic sulfate solution to divalent metal compounds.

According to one particular aspect, the invention relates to a system for processing iron sulfate mine waste and sequestering $CO_2$. In one embodiment, the system comprises:
  an electrochemical cell producing an alkali-containing catholyte;
  a $CO_2$ absorption reactor operatively connected to said electrochemical cell and to a source of $CO_2$, said $CO_2$ absorption reactor receiving said alkali-containing catholyte and said $CO_2$ for forming an alkaline carbonate solution; and
  a vessel for receiving a mine waste solution comprising iron sulfate and for receiving said alkaline carbonate solution, said vessel allowing precipitation of solid iron carbonate.

According to another particular aspect, the invention relates to a method for processing an iron sulfate mine waste solution and sequestering $CO_2$. In one embodiment the method comprises the steps of:
  providing an electrochemical cell producing an alkali-containing catholyte;
  providing a $CO_2$ absorption reactor operatively connected to said electrochemical cell and to a source of $CO_2$;
  feeding said $CO_2$ absorption reactor with said alkali-containing catholyte for forming an alkaline carbonate solution; and
  reacting in a vessel an acidic iron sulfate mine waste solution with said alkaline carbonate solution for precipitating solid iron carbonate compounds.

The present invention may also provide the additional benefit of scrubbing sulfur dioxide ($SO_2$) from waste gas while making more metal available in solution for metal carbonate precipitation. Accordingly, another particular aspect relates to a system for reducing trivalent metal compounds to divalent metal compounds and sequestering $CO_2$. In one embodiment, the system comprises:
  a $SO_2$ reduction reactor operatively connected to a source of $CO_2$ and $SO_2$ gas, and to a source of trivalent metal compounds, said $SO_2$ reduction reactor reducing trivalent metal compounds to produce a solution comprising divalent metal compounds;
  an electrochemical cell producing an alkali-containing catholyte;
  a $CO_2$ absorption reactor operatively connected to said electrochemical cell and to the $SO_2$ catalytic reduction reactor, said $CO_2$ absorption reactor receiving said alkali-containing catholyte from the electrochemical cell and $CO_2$ from the $SO_2$ reduction reactor for forming an alkaline carbonate solution; and
  a vessel for receiving said alkaline carbonate solution and for receiving said solution comprising divalent metal compounds, said vessel allowing precipitation of solid divalent metal carbonate compounds.

According to a related aspect, the invention relates to a method for reducing trivalent metal compounds to divalent metal compounds and sequestering $CO_2$. In one embodiment, the method comprises:

reducing trivalent metal compounds in a $SO_2$ reduction reactor to obtain an acidic sulfate solution comprising divalent metal compounds;

providing an electrochemical cell producing an alkali-containing catholyte;

circulating said alkali-containing catholyte into a $CO_2$ absorption reactor operatively connected to said electrochemical cell for forming an alkaline carbonate solution; and reacting in a vessel said acidic sulfate solution with said alkaline carbonate solution for precipitating solid carbonate compounds containing divalent metal.

In embodiments, the sulfate solution comprises sulfate compounds containing divalent metals and wherein precipitated solid metal carbonate compounds comprise carbonate compounds containing divalent metals.

In embodiments, the trivalent metal compounds contain trivalent (ferric) iron and, within the $SO_2$ catalytic reduction column, $SO_2$ reacts with said trivalent (ferric) iron to produce divalent (ferrous) iron in a sulfate form.

In embodiments, the trivalent metal compounds comprises at least one of $Fe(OH)_3$ or $Fe_2(SO_4)_3$, and the solid metal carbonate compound comprises $FeCO_3$.

In embodiments, the trivalent metal compounds comprise sulfide leachates from acid mine drainage, sulfide mine tailings and/or reacted pyrite concentrate. In embodiments, the sulfide leachates have a pH of about 1 to about 3.

In embodiments, the $SO_2$ reduction reactor comprises a catalyst selected from the group consisting of platinum, activated carbon, ruthenium, rhodium, and vanadium pentoxide.

In embodiments, the alkaline carbonate compound solution comprises at least one of carbonate ions, sodium carbonate, sodium bicarbonate, potassium carbonate, calcium carbonate and mixtures thereof. In embodiments, the carbonate compounds are produced by reacting said alkali-containing catholyte with $CO_2$ gas circulating inside the $CO_2$ absorption reactor.

In embodiments, the electrochemical cell is selected from the group consisting of brine electrolytic cells, bipolar membrane electrodialytic (BMED) cells and electro-electrodialytic (EED) cells.

BRIEF DESCRIPTION OF THE DRAWINGS

Embodiments of the invention are best understood by referring to the following description and accompanying drawings which illustrate such embodiments.

Figure 1:
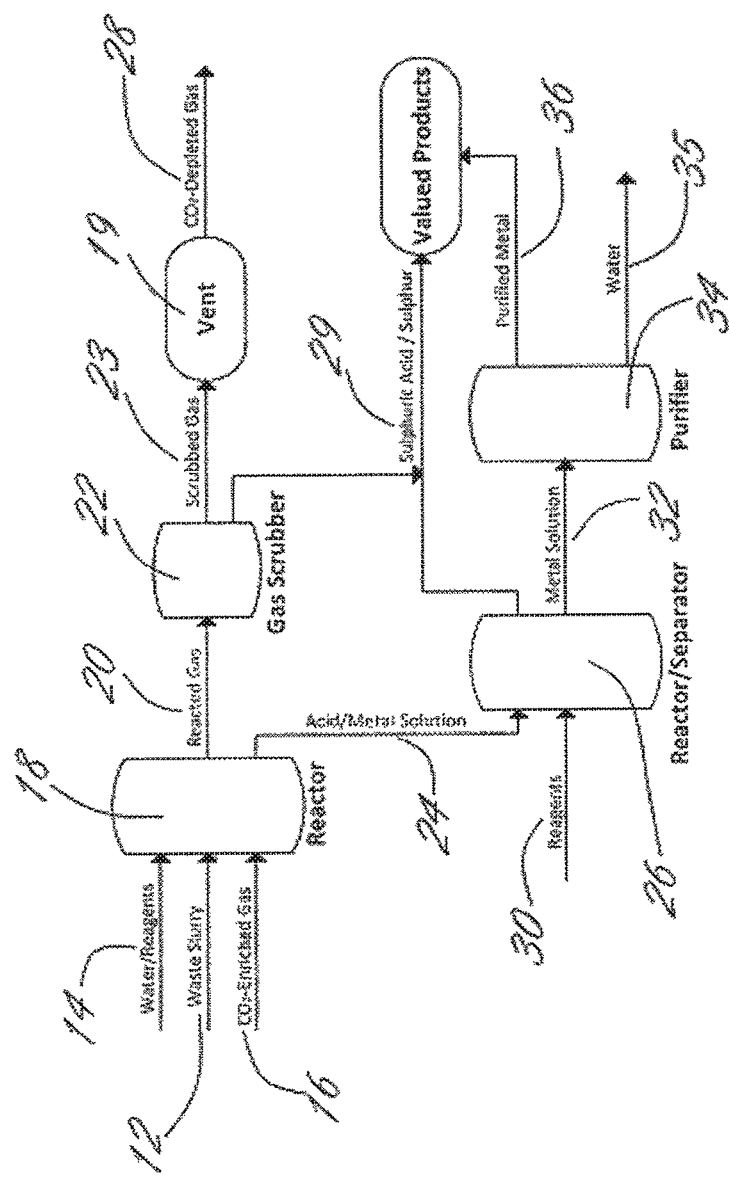
FIG. 1 is a block flow diagram depicting the reaction of a $CO_2$-enriched gas mixture with mine and industrial waste products which are in slurry form, with the recovery of $H_2SO_4$, $H_2S$, $SO_2$, $SO_3$, elemental sulfur and metal products, and the sequestration of $CO_2$ in carbonate minerals.

Reference will now be made in detail to certain claims of the invention, examples of which are illustrated in the accompanying structures and formulas. While the invention will be described in conjunction with the enumerated claims, it will be understood that they are not intended to limit the invention to those claims. On the contrary, the invention is intended to cover all alternatives, modifications, and equivalents, which may be included within the scope of the invention as defined by the claims.

PREFERRED EMBODIMENTS OF THE INVENTION

A detailed description of one or more embodiments of the invention is provided below along with accompanying Figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Unless defined otherwise, all technical and scientific terms used herein generally have the same meaning as commonly understood by one of ordinary skill in the art to which this invention belongs. Generally, the nomenclature used herein and the laboratory procedures in chemistry, analytical chemistry, geochemistry and mineralogy are those well-known and commonly employed in the art.

The term "invention" and the like mean "the one or more inventions disclosed in this application", unless expressly specified otherwise.

The terms "an aspect", "an embodiment", "embodiment", "embodiments", "the embodiment", "the embodiments", "one or more embodiments", "some embodiments", "certain embodiments", "one embodiment", "another embodiment" and the like mean "one or more (but not all) embodiments of the disclosed invention(s)", unless expressly specified otherwise.

The term "variation" of an invention means an embodiment of the invention, unless expressly specified otherwise.

A reference to "another embodiment" or "another aspect" in describing an embodiment does not imply that the referenced embodiment is mutually exclusive with another embodiment (e.g., an embodiment described before the referenced embodiment), unless expressly specified otherwise.

In this specification the terms "comprise, comprises, comprised and comprising" and the terms "include, includes, included and including" are deemed to be totally interchangeable and should be afforded the widest possible interpretation.

The terms "a", "an" and "the" mean "one or more", unless expressly specified otherwise.

The term "plurality" means "two or more", unless expressly specified otherwise.

The term "herein" means "in the present application, including anything which may be incorporated by reference", unless expressly specified otherwise.

The term "respective" and like terms mean "taken individually". Thus, if two or more things have "respective" characteristics, then each such thing has its own characteristic, and these characteristics can be different from each other but need not be. For example, the phrase "each of two machines has a respective function" means that the first such machine has a function and the second such machine has a function as well. The function of the first machine may or may not be the same as the function of the second machine.

The term "i.e." and like terms mean "that is", and thus limits the term or phrase it explains.

The term "STP" refers to Standard Temperature and Pressure as defined by the International Union of Pure and Applied Chemistry (273.15K, 0.986 atm).

The term "ARD" refers to Acid Rock Drainage; a condition caused by reactions between atmospheric oxygen, water and minerals. This condition may produce acidic runoff. This runoff is primarily composed of sulfuric acid ($H_2SO_4$) where sulfate and sulfide-rich minerals are oxidized. With the scope of the present invention, the source of an ARD comprises a metal sulfide or sulfate-containing material. In another embodiment, the metal sulfide or sulfate-containing material is selected from the group consisting of ore, mine waste rock and metal sulfide tailings. In yet another embodiment, the metal sulfide or sulfate-containing material comprises one or more metal sulfides selected from, but not limited to the group consisting of pyrite, pyrrhotite, marcasite, arsenopyrite, argentite, chalcopyrite, cinnabar, galena, molybdenite, pentlandite, realgar, sphalerite, stibnite, and combinations thereof.

The term "sulfide" refers to a binary compound of sulfur with a metal.

As used herein, the term "metal sulfide" refers to compounds containing both metal cations and sulfide or disulfide anions. These include, but are not limited to pyrite (iron disulfide, $FeS_2$), pyrrhotite ($Fe_{1-x}S$), marcasite (white iron pyrite), arsenopyrite (FeAsS), argentite ($Ag_2S$), chalcopyrite ($CuFeS_2$), cinnabar (HgS), galena (PbS), molybdenite ($MoS_2$), pentlandite [$(Fe,Ni)_9S_8$], realgar (alpha-$As_4S_4$), sphalerite [(Zn,Fe)S], stibnite ($Sb_2S_3$). The metal sulfide may be present as an impurity, a high content component or a low content component in a multitude of ores, including coals. As used herein, the term "sulfide-rich" refers to a chemical matter/material containing elevated levels (preferably >2% by weight) of sulfide minerals, including but not limited to those noted above. To be clear, the term "sulfide rich" encompasses compositions which additionally comprise sulfate-based compounds, as described herein.

As used herein, sulfate (also spelled sulphate) refers to the sulfate ion, a conjugate base of sulphuric acid. The sulfate ion is a polyatomic anion with the empirical formula $SO_2^{-4}$. Ionic sulfates are prepared by oxidizing metal sulfides or sulfites. While much focus on ARD is on acidity and dissolved metals due to their toxicity and environmental liability, somewhat less attention is focused on dissolved sulfate in ARD despite high concentrations in some systems. The process of the present invention addresses both.

The term "heap" refers to a mound, pile or dump of crushed and/or agglomerated ore located on an impermeably lined leach pad. This heap had been at one time during the operation of the associated mine, or was piled with the intention of being, irrigated with a solution designed to leach metals of interest.

The term "in-situ", in respect to a process, refers to a process taking place within an existing pile, heap or other source of material, by injecting or otherwise adding reactants, without removal or relocation of the solid source material.

The term "metal products" refers to saleable forms of concentrated or purified metals including, but not limited to, lead (Pb), zinc (Zn), copper (Cu) and iron (Fe).

The term "$CO_2$" refers to carbon dioxide gas.

The term "$CO_2$-enriched gas mixture" refers to a mixture of gases which contains elevated levels (generally >1% by weight) of $CO_2$. In a preferred form, pure $CO_2$ is not used as a reactant within the process of the invention. In a most preferred form, the $CO_2$-enriched gas mixture is a mixture of gases (for example, comprising not only $CO_2$ but also $O_2$, $N_2$ and/or $SO_2$). Within the scope of the invention, a wide variety of sources of $CO_2$ gases or gas mixtures may be used. Preferably, the $CO_2$ gas or $CO_2$ enriched gas mixture derives from a commercial or industrial $CO_2$ emitting course, for example a power plant, a lime kiln, a cement plant, a hydrocarbon-fueled electrical power generation facility, a heating plant, a natural gas processing plant, a synthetic fuel plant or fossil fuel-based hydrogen production plant or any other fossil fuel or biomass energy facility which is $CO_2$-generating. Most preferably, the $CO_2$-enriched gas mixture used for conversion of the sulfide minerals is sourced and used directly from hydrocarbon burning operations. The $CO_2$-enriched gases may be sourced, on one preferred form, from a lime or cement plant, or other industrial processes.

The term "$H_2SO_4$" refers to sulfuric acid, in aqueous solution.

The term "H₂S" refers to hydrogen sulfide in gaseous form.

The term "SO₂" refers to sulfur dioxide in gaseous form.

The term "SO₃" refers to sulfur trioxide in gaseous form.

The term "sequestration" refers to the capture and long-term storage of carbon, primarily from $CO_2$, in a form which will not readily release it back into the atmosphere without some degree of outside intervention. This eliminates the greenhouse potential of the stored carbon, as it is removed from the atmosphere.

The term "ore" refers to a mineral or an aggregate of minerals from which a valuable constituent, especially a metal, can be profitably mined or extracted.

The term "dry tailings" refers to the remaining portion of an ore consisting of finely ground rock after some or all of the desired material, such as a metal, has been extracted, and water removed by filtration.

The term "mine" refers to a site where the extraction of minerals, metals, or other geological materials from the earth, usually from an ore body, vein, or (coal) seam takes place. Materials recovered by mining include base metals, precious metals, iron, uranium, coal, diamonds, limestone, oil sands, oil shale, rock salt, and potash.

The term "mineral" refers to an element or chemical compound that is normally crystalline and that has been formed as a result of geological processes. It has a characteristic chemical composition, a highly ordered atomic structure, and specific physical properties. Minerals range in composition from pure elements and simple salts to very complex silicates with thousands of known forms. A rock is an aggregate of one or more minerals.

The term "mine waste" refers to any waste material, including but not limited to surface overburden, non-ore rock, lean ore, tailings, or hydrometallurgical residue generated during the process of excavation and beneficiation of ore that is stored, discarded, or disposed of. Mine waste is a known source of pollution due to its potential to generate ARD and to leach metals into the environment, polluting soils, surface water, and groundwater.

The term "slurry" refers to a thick suspension of solids in a liquid. Solid materials are often transported in a pipeline as a slurry.

The term "carbonate mineral" refers to minerals containing the carbonate ($CO_3^{2-}$) anion. Non-limiting examples are lead carbonate ($PbCO_3$, cerussite), zinc carbonate ($ZnCO_3$, smithsonite), magnesium carbonate ($MgCO_3$, magnesite), and iron carbonate ($FeCO_3$, siderite).

The term "solids" refers to the state of matter characterized by a distinct structural rigidity and resistance to deformation (that is changes of shape and/or volume). The particles in a solid (ions, atoms or molecules) are packed closely together. The forces between particles are strong enough so that the particles cannot move freely but can only vibrate. As a result, a solid has a stable, definite shape, and a definite volume.

The term "tailings" in mining refers to gangue or fine grained mineral remains of ore, once most of the valuable metals and minerals have been removed in the ore milling process. Tailings often contain residual valuable metals or minerals but at amounts that are uneconomical to recover through available milling processes. Tailings are a known source of pollution due to their potential to generate ARD and to leach metals into the environment.

The term "wet tailings" refers to the remaining portion of an ore comprising of finely ground rock and process liquid after some or all of the desired material, such as a metal, has been extracted. Wet tailings are a waste product of mining.

As used herein, "separating" refers to the process of removing solids, liquid and/or a gas from at least one of the other. The process can employ any technique known to those of skill in the art, e.g., decanting the mixture, filtering the solids from the mixture, or a combination thereof.

Any given numerical range shall include whole and fractions of numbers within the range. For example, the range "1 to 10" shall be interpreted to specifically include whole numbers between 1 and 10 (e.g., 1, 2, 3, 4, 9) and non-whole numbers (e.g. 1.1, 1.2, . . . 1.9).

Where two or more terms or phrases are synonymous (e.g., because of an explicit statement that the terms or phrases are synonymous), instances of one such term/phrase does not mean instances of another such term/phrase must have a different meaning. For example, where a statement renders the meaning of "including" to be synonymous with "including but not limited to", the mere usage of the phrase "including but not limited to" does not mean that the term "including" means something other than "including but not limited to".

Neither the Title (set forth at the beginning of the first page of the present application) nor the Abstract (set forth at the end of the present application) is to be taken as limiting in any way as the scope of the disclosed invention(s).

The Problems:

As noted above, ARD is a process whereby sulfuric acid is produced when sulfide minerals in rocks are exposed to air and water. For example, when large quantities of rock containing sulfide minerals are excavated from an open pit or exposed in an underground mine, they react with water and oxygen to create sulfuric acid. The acid will leach from the rock as long as it is exposed to air and water, until the sulfide minerals are fully reacted—a process that can last hundreds, even thousands of years. Acid is carried off the mine site by rainwater or surface drainage and deposited into nearby streams, rivers, lakes and groundwater. ARD severely degrades water quality, and can kill aquatic life and make water virtually unusable.

Figure 4:
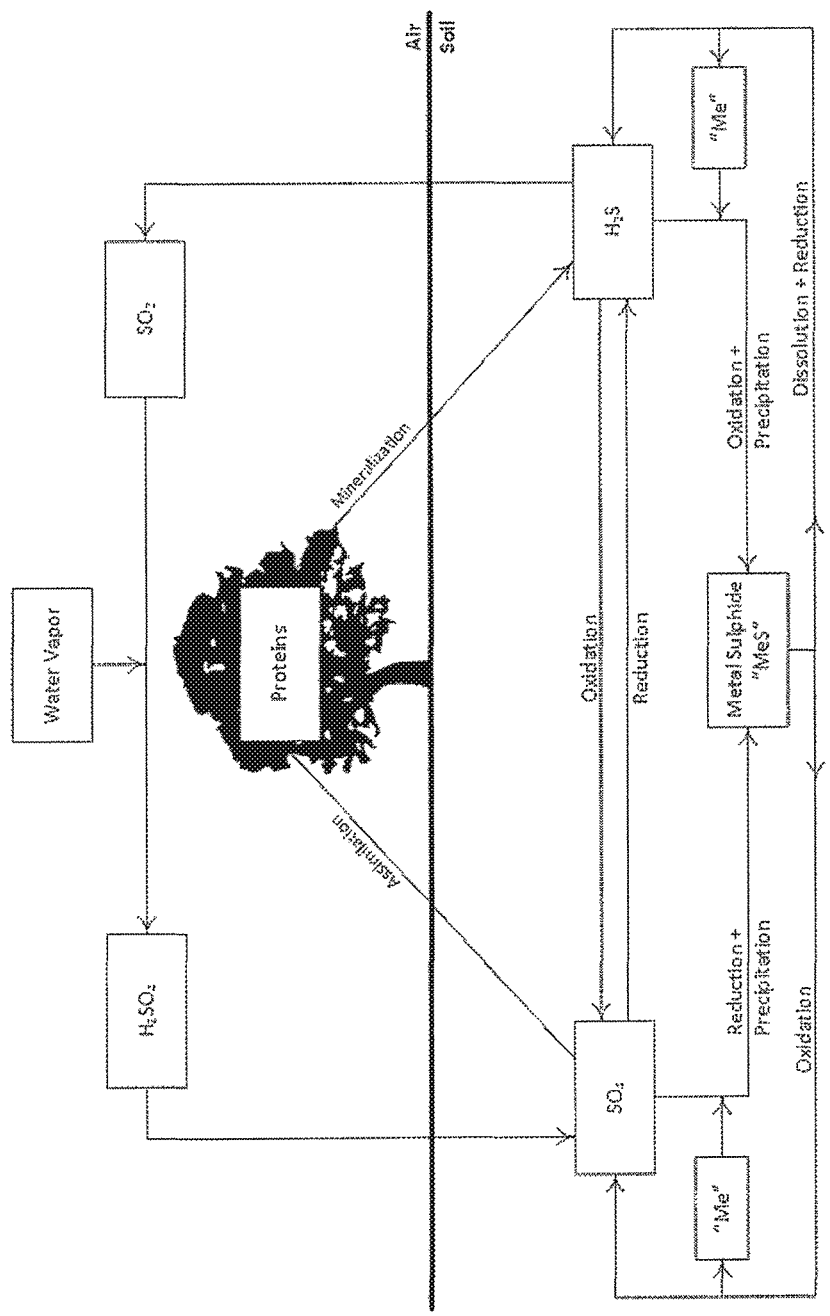
FIG. 4 is a block flow diagram depicting the biogeochemical cycle of sulfur.

FIG. 4 shows the geochemical cycle of sulfur. Most of the sulfur in the earth's sediments and crust is present in the form of primary elemental sulfur and sulfide minerals, which may be oxidized into sulfate through both biotic and abiotic processes. This is the process responsible for ARD.

Sulfate in soils can be taken up by plants and assimilated into proteins. When plants die and decay, microorganisms mineralize the sulfur in the proteins into hydrogen sulfide or sulfate. The hydrogen sulfide can then be combined with metals to form metal sulfides, or the hydrogen sulfide can be oxidized to elemental sulfur or sulfur dioxide, depending on redox conditions and involvement of biota. In cases where hydrogen sulfide combines with metals, authigenic or secondary sulfide minerals are formed. In the atmosphere, sulfur dioxide may be oxidized and combine with water to form sulfuric acid, which may report to the terrestrial and aqueous environment as acid rain. Direct transformation between sulfate and hydrogen sulfide can be accomplished through a variety of processes.

Human activities have had a major effect on the natural aspects of the aforementioned sulfur cycle and the formation of ARD. Without human impact, primary elemental sulfur and sulfide minerals would stay tied up in rocks for millions of years until they were uplifted through tectonic events and then released through erosion and natural weathering processes.

Like ARD, carbon sequestration is a topic receiving enormous attention in the media and among government agencies and industries involved in fossil fuel production and use. Combustion of fossil fuels is responsible for approximately 83% of greenhouse gas emissions in the U.S. Currently, the U.S. emits $6.0 \times 10^9$ tons carbon dioxide per year and this value is expected to increase by 27% over the next 20 years. Furthermore, the reported link between increasing concentrations of greenhouse gases such as carbon dioxide ($CO_2$) in the atmosphere and global climate change has prompted several countries to adopt environmental standards that cap $CO_2$ emissions and aim to reduce current emissions. Although the U.S. has not adopted a similar set of standards, in April 2007, the U.S. Supreme Court ruled that carbon dioxide was a pollutant and that the U.S. Environmental Protection Agency (U.S. EPA) has the authority and obligation to regulate carbon dioxide emissions from automobiles. More recently, the U.S. EPA has decided that carbon dioxide poses a threat to human health and the environment and that it will now be added to a list of 5 other greenhouse gases that can be regulated under the Clean Air Act. Given recent activity regarding carbon dioxide emission regulations, it is projected that the federal government may enact a carbon cap-and-trade bill. When this eventually occurs, utility companies and coal producers are in a position to be particularly affected by federal carbon dioxide regulation due to the large carbon dioxide footprint of coal-fired power plants. Although no carbon dioxide standards have been applied to power plant emissions in the U.S., plans for dozens of new coal-fired power plants have either been scrapped or delayed due to issues revolving around states concerned with future climate change legislation. Whether there is global consensus on the causes of climate change or not, it appears that carbon dioxide-emitting industries in the U.S. will soon be required to implement carbon management protocols that reduce emissions and (or) purchase or produce carbon credits.

Within the scope of the process of the present invention, one key aspect is the reduction of ARD and the reduction of metal leaching of sulfide-rich waste streams. Another key benefit to this process is the sequestration of $CO_2$ in carbonate minerals. These benefits occur through reactions such as, but not limited to, the following:

$$FeS_2+CO_2+2H_2O \rightarrow FeCO_3+2H_2S+0.5O_2$$

$$FeS_2+CO_2+2H_2O+3.5O_2 \rightarrow FeCO_3+2H_2SO_4$$

$$FeS+CO_2+H_2O \rightarrow FeCO_3+H_2S$$

$$FeS+CO_2+H_2O+2O_2 \rightarrow FeCO_3+H_2SO_4$$

$$ZnS+CO_2+H_2O \rightarrow ZnCO_3+H_2S$$

$$ZnS+CO_2+H_2O+2O_2 \rightarrow ZnCO_3+H_2SO_4$$

So, the invention provides a process to treat sulfate and/or sulfide-rich mine and industrial waste using $CO_2$-enriched gas mixtures to produce carbonate minerals, thereby sequestering $CO_2$, and reducing or eliminating the waste's ARD and/or metal leaching properties. Key processes include: (a) contacting sulfide-rich waste with a $CO_2$-enriched gas mixture, to produce reacted waste that is more stable in an ambient atmospheric environment; (b) recovering potentially valuable metal by-products from the reacted slurry; and (c) separating and recovering sulfuric acid or elemental sulfur from the reacted gas and fluids.

It is an object of the present invention to process sulfate and/or sulfide-rich mine waste using $CO_2$-enriched gas mixtures to produce carbonate minerals, thereby achieving the dual benefit of (1) reducing or eliminating ARD; and (2) sequestering $CO_2$.

It is another object of the present invention to separate sulfur compounds into value-added, saleable products (for example, sulfuric acid and elemental sulfur, etc.)

It is an object of the present invention to process sulfate and/or sulfide-rich mine waste, wherein said waste comprises one or more existing heaps, waste rock piles, tailings dams or stacks, and reprocessed slurries.

It is an object of the present invention, in one preferred aspect, to receive and process off-gasses from a hydrocarbon power plant, lime kiln, cement plant or other $CO_2$-emitting source. It is an additionally preferred aspect of the present invention that the process does not require further artificially elevated temperature or pressure to operate and to achieve the reaction goals.

It is an object of the present invention to expose a sulfate and/or sulfide-rich mine or industrial waste to a $CO_2$-enriched gas mixture to produce a reacted waste that is stable at ambient, atmospheric environment(s).

It is an object of the present invention, in one preferred aspect, to receive and process off-gasses from a hydrocarbon power plant, lime kiln, cement plant or other $CO_2$-emitting source wherein such gases are $CO_2$-enriched gases, and not pure $CO_2$. In this embodiment, it is preferred that there is used, within the process of the invention, a mixture of gases (potentially containing $O_2$, $N_2$ and/or $SO_2$) than with pure $CO_2$.

In one aspect of the present invention, the mine waste is selected from the group consisting of dry mine waste, dry tailings, wet tailings and heaps. More specifically, the mine waste to be treated can be either coarse or fine rock.

The present invention provides a process for stabilizing a sulfate and/or sulfide-rich waste material (comprising metal sulfide minerals and/or metal sulfates) which comprises exposing the material to a $CO_2$-enriched gas mixture, reacting the $CO_2$-enriched gas mixture with the metal sulfide minerals and forming a $CO_2$-depleted gas mixture and a carbonate-containing compound and at least one product selected from the group consisting of a purified metal or a metal-rich compound suitable for smelting or refining, sulfuric acid, sulfur, and sulfurous acid.

In one aspect, within the reaction zone or reaction vessel, when the waste, gas mixture, water and other reactants are combined, there are conditions of Standard Temperature and Pressure (STP). In other words, in this aspect, it is not required to make external modifications to temperature or pressure conditions in order for the dual processes of the present invention to occur. That said, during the reaction, temperature and pressure may increase as a consequence of the chemical reactions. Furthermore, temperature or pressure conditions in the reaction zone or reaction vessel may become inherently elevated as a consequence of the addition of a $CO_2$-enriched gas mixture from a source, for example, a hydrocarbon burning operation.

In another aspect, temperature and/or pressure in the reaction zone or reaction vessel may be elevated. Such ranges of temperature and pressure may vary. These conditions may be manipulated by operators of the system or may be as a consequence of high-temperature feed gases entering the reaction zone directly from a power plant, lime kiln, cement plant or other $CO_2$ source, as described herein.

In this way, temperature in the reaction zone may increase to a temperature of:
  up to about 500° C.;
  up to about 400° C.;
  up to about 300° C.;
  up to about 200° C.; or
  up to about 150° C.

In this way, pressure in the reaction zone or reaction vessel may locally be elevated:
- up to about 10 atmospheres;
- up to about 7 atmospheres;
- up to about 5 atmospheres; or
- up to about 2 atmospheres.

Such pressure and/or temperature elevation occurs for a suitable length of time, in accordance with the reactions described and claimed herein, to facilitate reactant flow and mixing. Exemplary lengths of time range from one minute to 24 hours.

It is preferred that the means to separate solid and liquid reacted products are filters.

In one aspect, the apparatus of the invention may further include one or more of the following: (a) a reactor which separates Sulfuric Acid ($H_2SO_4$) from reacted liquid products; (b) a reactor which produces elemental sulfur from reacted liquid products; (c) a purifier which produces either concentrated metal in solution or solid metal products; (d) a crushing and grinding circuit which can produce fine-grained material from a feed stream of varying size; (e) a scrubber which removes Hydrogen Sulfide ($H_2S$), Sulfur Dioxide ($SO_2$) or Sulfur Trioxide ($SO_3$) gas from reacted gas products.

In yet a further aspect of the invention, there is provided a system adapted to contain an in situ process, for example, wherein the reaction zone is a contained in situ waste site. In this case, the system comprises: (a) a source of sulfate and/or sulfide-rich mine or industrial waste located in a heap or pile on a non-permeable liner; (b) a series of pipes or lined trenches for draining reacted liquid off the non-permeable liner; (c) a vessel for storing reacted liquid; (d) a cap or cover to trap injected gas; (e) a source of a $CO_2$-enriched gas mixture; (f) water and other reactants; (g) a pipe system beneath the cover to distribute water and reactants on the heap; (h) a pipe system to inject the $CO_2$-enriched gas mixture into the waste material wherein it will combine with the waste materials, water and other reactants at STP or at an elevated temperature up to about 250° C. (more probably up to 100° C.) and/or elevated pressure up to about 5 atmospheres (more probably up to 2 atmospheres).

The system, when used for an in situ process, may further include one or more of the following: (a) a heat exchanger to control the temperature of the water and other reactants; (b) a heat exchanger to lower or elevate the temperature of the $CO_2$-enriched gas mixture; (c) a reactor which separates $H_2SO_4$ from the drained reacted liquid; (d) a reactor which produces elemental sulfur from the drained reacted liquid; (e) a purifier which produces either concentrated metal in solution or solid metal products; (f) a pressure release system which allows collection of reacted gas products; (g) a scrubber which removes $H_2S$, $SO_2$ or $SO_3$ gas from reacted gas products.

In operation, and with reference to FIGS. 1-3, the process is preferably as follows:

FIG. 1 illustrates a block flow diagram depicting the reaction of a $CO_2$-enriched gas mixture with mine and industrial waste products which are in slurry form, with the recovery of $H_2SO_4$, $H_2S$, $SO_2$, $SO_3$, elemental sulfur and metal products, and the sequestration of $CO_2$ in carbonate minerals from waste slurry 12. While any suitable and appropriate substance can be employed to form the slurry 12 from waste, water is a particularly suitable substance. In specific embodiments, a waste stream will include the requisite amount of water such that it is effectively a slurry.

Slurry 12, along with a stream of water/reagents 14 and $CO_2$-enriched gas mixture 16 is fed into reactor 18. From reactor 18, reacted gas 20 is directed to scrubber 22 and an acid/metal solution 24 is fed to a reactor/separator 26.

Scrubber 22 is preferably a $H_2S$, $SO_2$ or $SO_3$ scrubber by which $CO_2$-depleted gas 28 is released to the atmosphere and sulfuric acid/sulfur 29 is recovered. Preferably scrubbed gas 23 is released from scrubber 22, and fed to vent 19. $CO_2$-depleted gas 28 is released to the atmosphere from vent 19. Reagents 30 are fed to reactor/separator 26 yielding from the reaction therein sulfuric acid/sulfur 29 and metal solution 32 which is fed to purifier 34. The products of purifier 34 comprise water 35 and purified metal 36.

Figure 2:
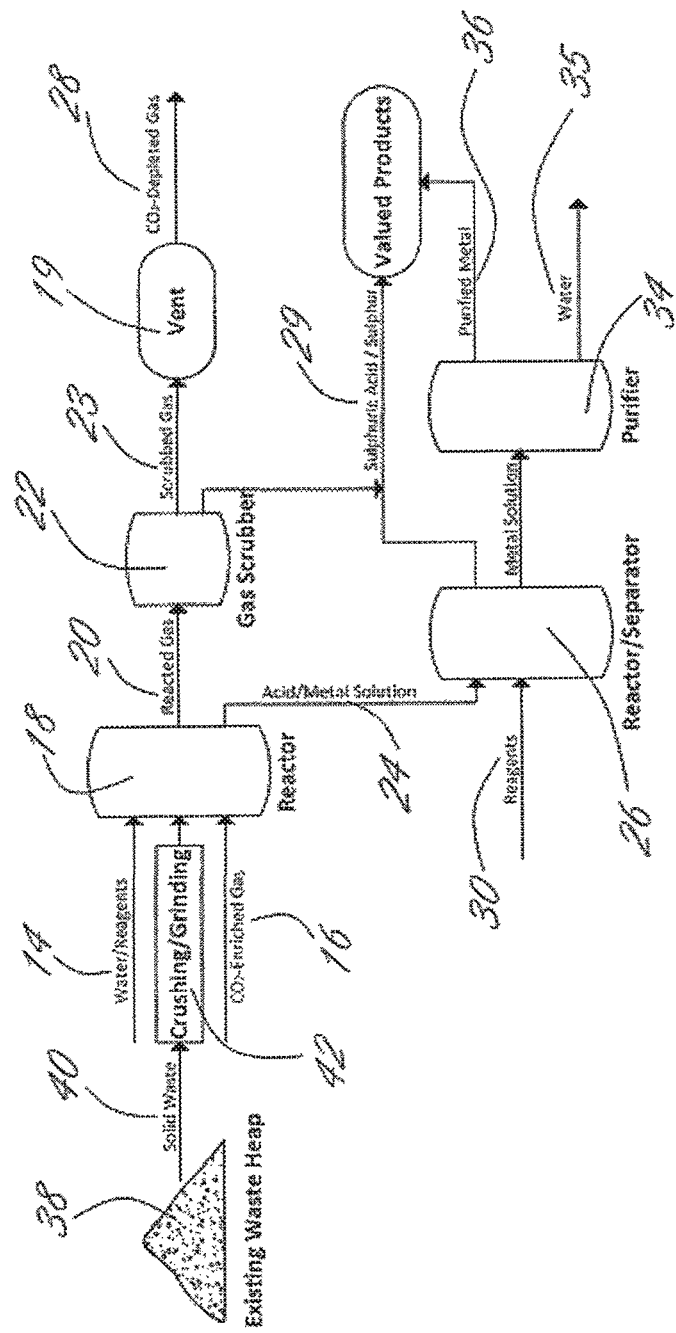
FIG. 2 is a block flow diagram depicting the reaction of a $CO_2$-enriched gas mixture with mine and industrial waste products which require further grinding and/or crushing, with the recovery of $H_2SO_4$, $H_2S$, $SO_2$, $SO_3$, elemental sulfur, and metal products, and the sequestration of $CO_2$ in carbonate minerals.

FIG. 2 illustrates a block flow diagram depicting the reaction of a $CO_2$-enriched gas mixture with mine and industrial waste products which requires further grinding and/or crushing, with the recovery of $H_2SO_4$, $H_2S$, $SO_2$, $SO_3$, elemental sulfur, and metal products, and the sequestration of $CO_2$ in carbonate minerals. The process is the same as the process of FIG. 1 with the exception of pre-processing of existing waste heap 38. In this manner, solid waste 40 from heap 38 is ground and/or crushed at 42 forming ground/crushed waste. Ground/crushed waste is fed to reactor 18 in a process as noted above.

Figure 3:
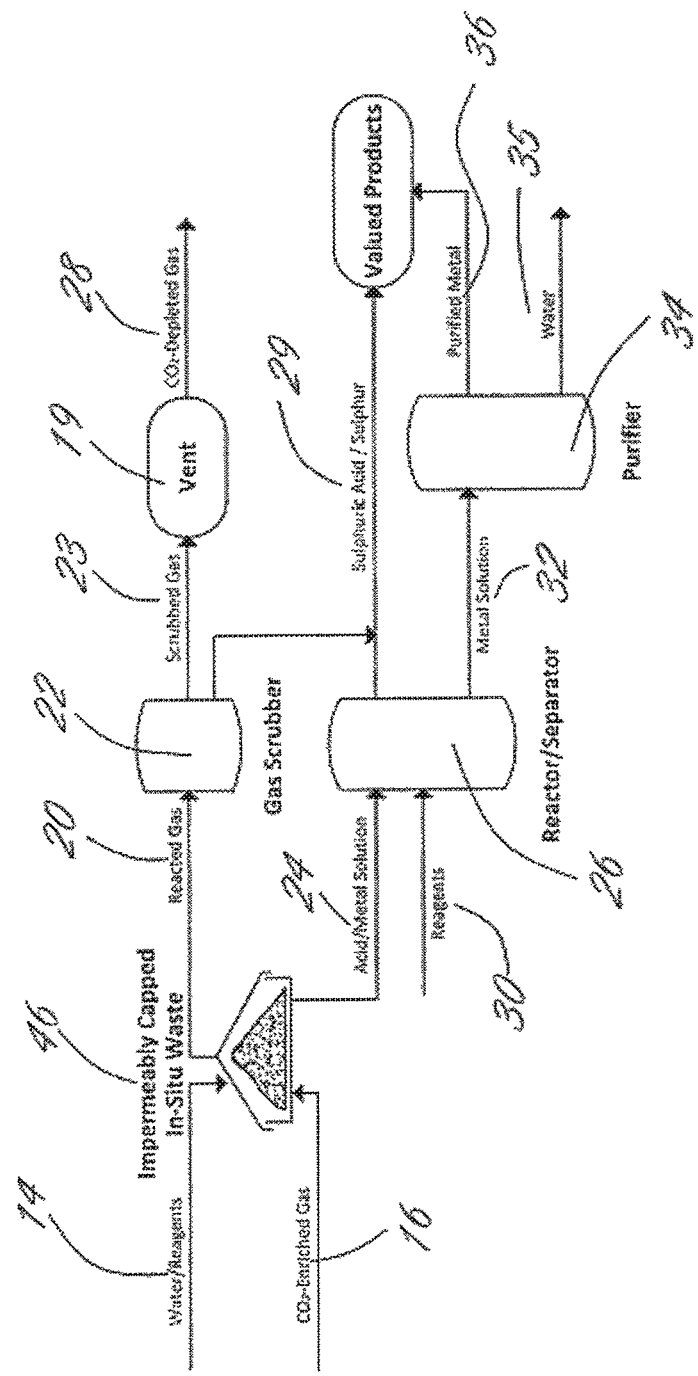
FIG. 3 is a block flow diagram depicting an in-situ reaction of a $CO_2$-enriched gas mixture with coarse material from an existing mine or industrial waste heap, with the recovery of $H_2SO_4$, $H_2S$, $SO_2$, $SO_3$, elemental sulfur, and metal products, and the sequestration of $CO_2$ in carbonate minerals.

FIG. 3 illustrates a block flow diagram depicting an in situ reaction of a $CO_2$-enriched gas mixture with coarse material from an existing mine or industrial waste heap, with the recovery of $H_2SO_4$, $H_2S$, $SO_2$, $SO_3$, elemental sulfur, and metal products, and the sequestration of $CO_2$ in carbonate minerals. In this aspect, impermeably or substantially impermeably capped waste 46 is the reaction zone into which water/reagents 14 and $CO_2$-enriched gas mixture 16 is fed. The process thereafter is the same as FIG. 1.

Within one aspect of the present invention, a reactor or reaction zone may comprise two or more counter-current cells. In this aspect, the slurry, reagents and/or water flow into a first cell in sequence, then proceed onwards through a series of latter cells. The $CO_2$-enriched reaction gasses will proceed counter-current, first entering the last cell in sequence and progressing in reverse, towards the first cell. This configuration and system may promote more complete sulfide neutralization reactions with certain combinations of $CO_2$-enriched gas and sulfide minerals as the highest concentration of $CO_2$-enriched gas will encounter the lowest concentrations of sulfide minerals first, thus driving the reactions further to completion.

Figure 5:
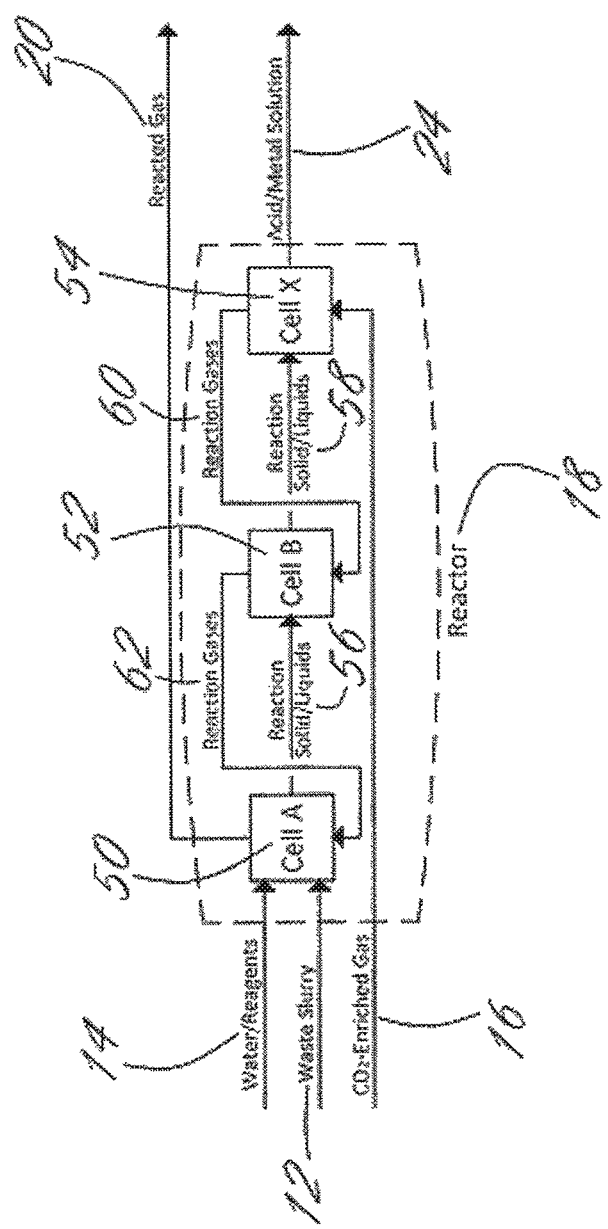
FIG. 5 is a block flow diagram of a counter-current reactor in accordance with one aspect of the present invention.

FIG. 5 illustrates a block flow diagram depicting a reactor 18 comprising multiple counter-current reaction cells (50, 52 and 54, also noted as Cell A, Cell B and Cell X, respectively). While this figure shows three cells it is meant to represent any number from two or higher connected in a similar fashion (hence 54 or Cell X is be the "last cell" of any number of cells). Waste slurry 12, water and/or reagents 14 enter the first cell 50 and feed onwards through subsequent cells (50 (A)->52(B)-> . . . ->54(X). Reaction solids/reaction liquid products shown Cell A(50) to Cell B(52) as 56 and reaction solids/reaction liquid products shown Cell B(52) to Cell X(54) as 58.

$CO_2$-enriched gas 16 enters the last cell (54 or X) and proceeds in reverse direction (right to left) to the first cell ((54)X→ . . . (52)B→(50)A)). Acid/metal solution 24 exits from the last cell and reacted gas 20 exits from the first cell. Reaction gases shown Cell X(54) to Cell B(52) as 60 and reaction gases shown Cell B(52) to Cell A(50) as 62.

Generally, an effective amount of $CO_2$ enriched gas mixture in accordance with the present invention to be used with the metal sulfide-containing mine or industrial waste is an amount (and in a flow) sufficient to interact with most or all reactive sites of the metal sulfide compounds in the metal sulfide-containing material. As such, the amount of the of $CO_2$ enriched gas mixture to be reacted with the metal sulfide-containing material or the area in need of treatment will vary widely, and may be determined to the person skilled in the art, based on the surface area to be treated, the volume of material to be treated, the pH of the material to be treated, concentration and species of sulfate and/or sulfide present and the overall moisture level in the material to be treated. Generally, the amount of $CO_2$ enriched gas mixture used will be in excess of that theoretically required to ensure complete reaction of sulfates and/or sulfides.

As alluded to above, the amount of contact time between the $CO_2$ enriched gas mixture and the metal sulfate and/or sulfide-containing material to ensure proper reaction with the metal sulfate and/or sulfide-containing material, as required by the present invention, may vary depending on the environmental factors present at the time. The contact time may be less than 5 minutes, between 5 and 15 minutes, between 15 and 30 minutes, between 30 minutes and 1 hour, between 1 hour and 5 hours, between 5 hours and 1 day, between 1 day and 3 days, between 3 days and 7 days, between 7 days and 14 days, between 14 days and 1 month, between 1 month and 3 months, between 3 months and 1 year, or any fraction or multiple thereof. The required amount of reaction time may be estimated by those skilled in the art, based on sampling of the metal sulfate and/or sulfide-containing material and determination of extent of reactivity between the $CO_2$ enriched gas mixture and the metal sulfate and/or sulfide-containing material using the methods known in the art and/or disclosed in the present application.

In one aspect, the present invention provides a process for stabilizing a sulfate and/or sulfide-rich waste material (comprising metal sulfide minerals) and sequestering $CO_2$ which comprises exposing the waste material to a $CO_2$-enriched gas mixture, reacting the $CO_2$-enriched gas mixture with the metal sulfide minerals and forming a $CO_2$-depleted gas mixture and a carbonate-containing compound and at least one product selected from the group consisting of a purified metal or a metal-rich compound suitable for smelting or refining, sulfuric acid, sulfur, hydrogen sulfide, sulfur dioxide, sulfur trioxide and sulfurous acid.

Preferably, $CO_2$-enriched gas mixture is sourced from at least one of a commercial and industrial $CO_2$ emitting source. Preferably, $CO_2$-enriched gas mixture comprises >1% by weight of $CO_2$. Preferably, $CO_2$-enriched gas mixture comprises $CO_2$ and at least one of $O_2$, $N_2$ and/or $SO_2$. Preferably, $CO_2$-enriched gas mixture is sourced from one of a fossil fuel-based hydrogen production plant and a biomass energy facility which is $CO_2$-generating. Preferably, $CO_2$-enriched gas mixture is sourced from at least one of a power plant, a lime kiln, a cement plant, a hydrocarbon-fueled electrical power generation facility, a heating plant, a natural gas processing plant, and a synthetic fuel plant, which is $CO_2$-generating.

In one aspect, the waste material is selected from the group consisting of surface overburden, non-ore rock, lean ore, tailings, and hydrometallurgical residue generated during a process of excavation and beneficiation of ore that is at least one of: stored, discarded, and disposed of. Preferably, the waste material is at least one of dry and wet mine tailings.

Preferably, the metal sulfide minerals comprise at least one of the following: pyrite (iron disulfide, $FeS_2$), pyrrhotite ($Fe_{1-x}S$), marcasite (white iron pyrite), arsenopyrite (FeAsS), argentite ($Ag_2S$), chalcopyrite ($CuFeS_2$), cinnabar (HgS), galena (PbS), molybdenite ($MoS_2$), pentlandite [(Fe,Ni)$_9$S$_8$], realgar (alpha-$As_4S_4$), sphalerite [(Zn,Fe)S], and stibnite ($Sb_2S_3$). Preferably, purified metal is a metal rich compound comprising at least one concentrated and/or purified metals selected from the group consisting of lead (Pb), zinc (Zn), copper (Cu) and iron (Fe).

In one aspect, the waste material in a reactor/reaction zone is at substantially standard temperature and pressure (STP) when initially exposed to $CO_2$-enriched gas mixture in a reaction zone. In another aspect, in a reaction between the waste material and $CO_2$-enriched gas mixture in a reactor or reaction zone, a temperature is selected from one of the following:
  a) up to about 500° C.;
  b) up to about 400° C.;
  c) up to about 300° C.;
  d) up to about 200° C.;
  e) up to about 150° C.;
  and a pressure is selected from one of the following:
  a) up to about 10 atmospheres;
  b) up to about 7 atmospheres;
  c) up to about 5 atmospheres;
  d) up to about 2 atmospheres.

In one aspect, a reaction between the waste material and $CO_2$-enriched gas mixture occurs in one of i) a reactor or ii) a reaction zone and the reaction zone is selected from: i) an in situ waste site and ii) two or more counter-current cells.

In another aspect, there is provided herein a process for stabilizing a sulfate and/or sulfide-rich waste material (comprising metal sulfide minerals) and sequestering $CO_2$ which comprises: (a) contacting a sulfide-rich waste with a $CO_2$-enriched gas mixture in a reaction zone to produce reaction mixture; (b) recovering from the reaction mixture metal by-products; and (c) separating and recovering one or more of sulfuric acid, sulfur, hydrogen sulfide, sulfur dioxide, sulfur trioxide and sulfurous acid from the reaction mixture.

In another aspect, there is provided herein an apparatus for processing sulfate and/or sulfide-rich mine and industrial waste that comprises:
  (a) a reactor/reaction zone comprising mine or industrial waste wherein the waste comprises at least one of crushed or ground waste rock, dry tailings, wet tailings, ore stockpiles, or other sulfide-rich materials;
  (b) feed line into the reactor/reaction zone, for delivery of a $CO_2$-enriched gas mixture;
  (c) feed line for water and other reactants; and
  (d) means to separate solid and liquid reacted products.

Preferably, the apparatus comprises at least one of the following: (a) a heat exchanger to control a temperature of water and other reactants; (b) a heat exchanger to lower or elevate a temperature of the $CO_2$-enriched gas mixture; (c) a reactor which separates $H_2SO_4$ from the liquid reacted products; (d) a reactor which produces elemental sulfur from the liquid reacted products; (e) a purifier which produces either concentrated metal in solution or solid metal products; (f) a pressure release system which allows collection of any reacted gas products; (g) a scrubber which removes $H_2S$, $SO_2$ or $SO_3$ gas from said reacted gas products.

Preferably, the apparatus comprises at least one of the following: (a) a reactor which separates Sulfuric Acid ($H_2SO_4$) from liquid reacted products; (b) a reactor which produces elemental sulfur from liquid reacted products; (c) a purifier which produces either concentrated metal in solution or solid metal products; (d) a crushing and grinding circuit which can produce fine-grained material from a feed stream of varying size; (e) a scrubber which removes Hydrogen Sulfide ($H_2S$), Sulfur Dioxide ($SO_2$) or Sulfur Trioxide ($SO_3$) gas from any reacted gas products.

In another aspect, there is provided herein a system for stabilizing a sulfate and/or sulfide-rich waste material (comprising metal sulfide minerals) and sequestering $CO_2$ and adapted to contain an in situ process, wherein a reaction zone is a contained in situ waste site, said system comprising: (a) a source of sulfide-rich mine or industrial waste located in one of i) a heap and ii) pile on a non-permeable liner; (b) a series of pipes/lined trenches for draining a reacted liquid product off the non-permeable liner; (c) a vessel for storing reacted liquid product; (d) a cap/cover to trap injected gas; (e) a source of a $CO_2$-enriched gas mixture; (f) water and other reactants; (g) a pipe system beneath the cap/cover to distribute water and reactants on the heap/pile; and (h) a pipe system to inject the $CO_2$-enriched gas mixture into the waste material wherein $CO_2$-enriched gas mixture may combine with the waste material, water and other reactants.

Preferably, in the system, wherein heap/pile is reaction zone reactions occur at one of i) STP and ii) an elevated temperature up to about 250° C. and/or elevated pressure up to about 5 atmospheres.

In another aspect, there is provided herein a process for stabilizing a sulfate and/or sulfide-rich waste material (comprising metal sulfide minerals) and sequestering $CO_2$ which comprises exposing the waste material to a $CO_2$-enriched gas mixture in a reactor/reaction zone, wherein reactor/reaction zone comprises at least two counter-current cells and wherein waste material, reagents and/or water flow into a first cell in sequence, then proceed onwards (in a first direction) through a series of latter cells to a last cell and wherein $CO_2$-enriched gas mixture flow in a second, opposite direction, in counter-current to first direction, such that $CO_2$-enriched gas mixture enters the last cell and proceeds to the first cell, said process forming a $CO_2$-depleted gas mixture and a carbonate-containing compound and at least one product selected from the group consisting of a purified metal or a metal-rich compound suitable for smelting or refining, sulfuric acid, sulfur, hydrogen sulfide, sulfur dioxide, sulfur trioxide and sulfurous acid.

Further, in the processes taught herein, the various acts may be performed in a different order than that illustrated and described. Additionally, the processes can omit some acts, and/or employ additional acts. As will be apparent to those skilled in the art, the various embodiments described above can be combined to provide further embodiments. Aspects of the present systems, processes and components can be modified, if necessary, to employ systems, processes, components and concepts to provide yet further embodiments of the invention. For example, the various processes described above may omit some acts, include other acts, and/or execute acts in a different order than set out in the illustrated embodiments.

These and other changes can be made to the present systems, processes and articles in light of the above description. In general, in the following claims, the terms used should not be construed to limit the invention to the specific embodiments disclosed in the specification and the claims, but should be construed to include all possible embodiments along with the full scope of equivalents to which such claims are entitled. Accordingly, the invention is not limited by the disclosure, but instead its scope is to be determined entirely by the following claims.

Uses of Electrochemical Cells

FIGS. 1, 2, 3 and 5 described herein before refer to feeding a $CO_2$-enriched gas mixture into reactor 18 and subsequently to scrubber 22 for removing $SO_2$. The present inventors have devised a revised process to improve treatment of metal sulfide compounds, including but not limited to iron sulfide. In the revised process that will be described hereinafter with reference to FIGS. 6-11, one or more alkali producing electrochemical cells are operatively connected to a $CO_2$ absorption reactor. The electrochemical cell(s) is(are) used to provide an alkali-containing catholyte that is circulated into the $CO_2$ absorption reactor. The $CO_2$ absorption reactor is also operatively connected to a source of $CO_2$. The $CO_2$ absorption reactor receives the alkali-containing catholyte and $CO_2$ gas for forming an alkaline carbonate solution. The alkaline carbonate solution is then directed to a vessel to react with an acidic sulfate solution comprising metal ions (e.g. ARD). The reaction results in the precipitation of solid metal carbonate compounds. In addition, the acidic sulfate solution may be circulated through an optional $SO_2$ reduction reactor prior to the reacting in the vessel. The purpose of the $SO_2$ reduction reactor is to reduce trivalent metal compounds present in the acidic sulfate solution to divalent metal compounds, the latter being the species available for carbonate precipitation. The acidic sulfate solution used in the process may comprise sulfide leachates from acid mine drainage, sulfide mine tailings and/or reacted pyrite concentrate. Details about the use of electrochemical cell(s), $CO_2$ absorption reactor, $SO_2$ reduction reactor and precipitation are provided hereinafter.

Accordingly, additional aspect of the invention involves the use of electrochemical cells in connection with environmental remediation and more particularly in connection with treatment of acid mine drainage and sequestration of carbon dioxide.

According to particular aspects, the invention concerns systems, methods, processes and electrochemical cells for obtaining solid metal carbonate compounds from metal sulfate compounds, including metal sulfate compounds containing divalent metal cations.

According to one particular embodiment, sulfide leachates (e.g. from AMD) provides aqueous divalent metal cations (e.g. $Fe^{2+}$) in solution with sulfate anions ($SO_4^{2-}$) to precipitate solid metal carbonate compounds (e.g. iron carbonate). The divalent metal cations may also derive from other sources such as ferruginous sandstones (Fe), fine-grained metal-rich clay sediment of glacial or fluvial origin (e.g. Fe, Mg, Na, Ca, or others), seawater (Na, Ca), or waste products from industrial processes (various metal ions).

Figure 8:
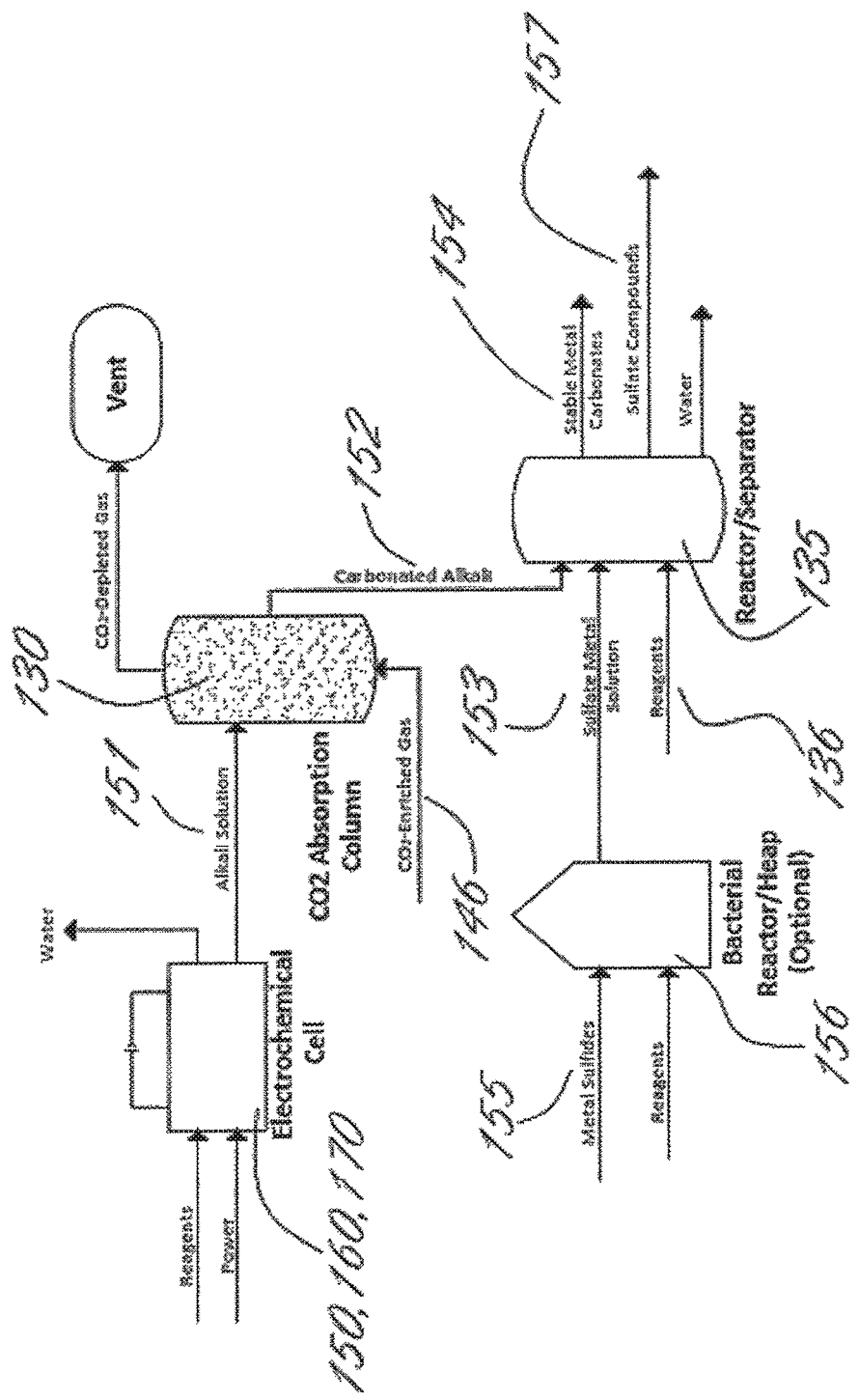
FIG. 8 is a block flow diagram depicting a process incorporating an electrochemical cell and a $CO_2$ absorption column for processing metal sulfate compounds, according to one particular embodiment.
Figure 9:
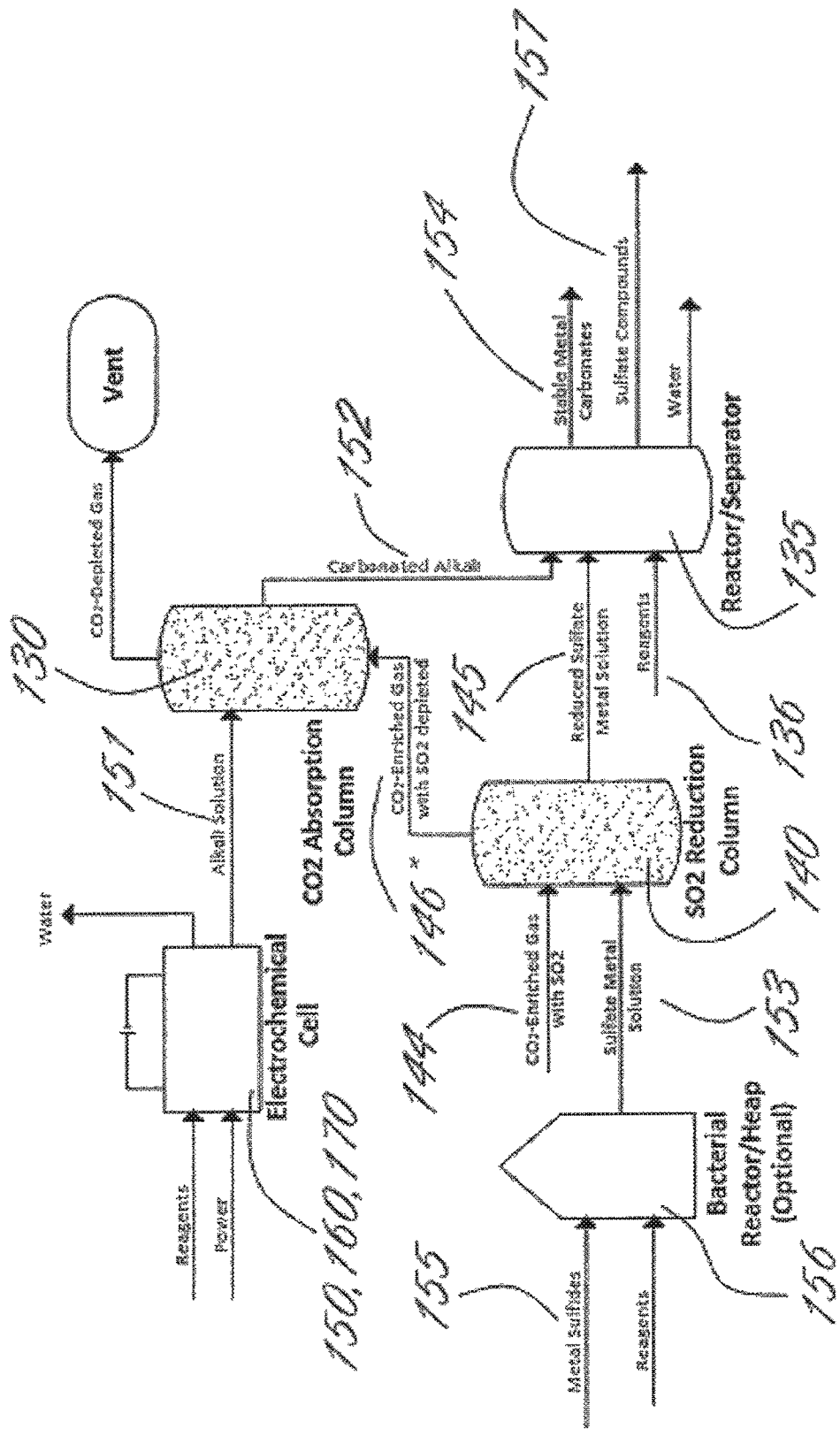
FIG. 9 is a block flow diagram depicting a process incorporating an electrochemical cell, a $CO_2$ absorption column and a $SO_2$ reduction reactor for processing metal sulfate compounds, according to one particular embodiment.

In one embodiment, the aqueous divalent metal cations are derived from solid sulfide mine tailings or waste pyrite concentrate and these are leached with the aid of iron-oxidizing bacteria in a heap or reactor (e.g. 156 in FIGS. 8 and 9). Expected output from this step will be an aqueous solution containing sulfuric acid and iron concentrations on the order of 50 g/L. Alternatively, acid mine drainage (AMD) from polluting sites could be contained and used in processes described herein for remediating acid mine drainage as well as providing inputs for $CO_2$ sequestration (see hereinafter) without the requirement for reaction with iron-oxidizing bacteria. For sites without significant sulfide drainage or solid sulfide sources, or projects requiring emphasis on carbon dioxide sequestration, concentrated pyrite ($FeS_2$) may be transported to the site for leaching and treatment.

Acid mine drainage commonly consists of solutions containing sulfate compounds containing divalent metal cations and, therefore, the present embodiments and figures refer to compounds containing divalent metal cations (e.g. sulfate compounds containing a divalent metal cation or solid carbonate compounds containing a divalent metal cation). However, those skilled in the art will readily appreciate that the present invention is amenable to monovalent metal compounds as well and that the chemical formula, methods, processes described herein can easily be adapted to monovalent metal compounds. For instance, the sulfate compounds to be fed to the electrolytic cell could possibly be potassium sulfate ($K_2SO_4$) or sodium sulfate ($Na_2SO_4$). Accordingly, the resulting solid carbonate precipitate could possibly be potassium carbonate ($K_2CO_3$) or sodium carbonate ($Na_2CO_3$), respectively. Therefore, certain embodiments the present invention encompass monovalent metal compounds.

As used herein, the term "electrochemical cell" encompasses brine electrolytic cells, bipolar membrane electrodialytic (BMED) cells and electro-electrodialytic (EED) cells as defined hereinafter.

One of the benefits associated with the use of electrochemical cells according to the present invention is the reduced energy requirements for the treatment/remediation of Acid Rock Drainage (ARD) or Acid Mine Drainage (AMD). As is known, in order to produce carbonate minerals from a source of acid mine drainage, a large source of alkalinity is required and production of alkaline solution is the most energy-intensive and capital-intensive part. Electrolysis or electrodialysis of brine, and subsequent carbonation using the electrochemical cells described herein provides a feasible source of alkalinity that lowers energy requirements.

For instance, the following are typical characteristics of iron sulfide acid rock drainage (Blowes et al., 2003):

1—Components of iron sulfide drainage waters:
$H_2O$, $Fe^{3+/2+}$, $H^+$, $SO_4^{2-}$ are introduced by these two simplified reactions (Rimstidt et al., 2003):
a. $FeS_2 + 7/2 O_2 + H_2O \rightarrow Fe^{2+} + 2 SO_4^{2-} + 2 H^+$ (Iron sulfide reacts with water and oxygen)
b. $Fe^{2+} + \frac{1}{4} O_2 + H^+ \rightarrow Fe^{3+} + \frac{1}{2} H_2O$ (Ferrous iron oxidizes to ferric iron)

2—pH of 1-3

Alkalinity is low unless there is interaction with carbonate minerals. For carbonates to form, alkalinity must be increased by orders of magnitude. The invention addresses this problem using alkali-producing electrolytic or electrodialytic cells as described in details herein.

With respect to the treatment/remediation of Acid Rock Drainage (ARD), one particular aspect of the present invention lies in the production of an aqueous solution having a high pH and a high $CO_3^{2-}$ concentration in order to neutralize acidic components of ARD and to create suitable conditions for reaction of divalent metal cations to precipitate carbonates (e.g. $Fe^{2+}$ to precipitate as siderite ($FeCO_3$)). Considering that ARD have typically a pH of 1-3, this involves a significant increase in the pH.

The present invention addresses this problem by using electrochemical cells to produce high-pH alkali solutions for subsequent carbonation and reaction.

Brine Electrolytic Cells, BMED Cells and EED Cells

Particular aspects of the present invention concerns methods, process and systems using brine electrolytic cells for producing an alkali-containing catholyte that is subsequently used for treating sulfide mine waste and sequestering $CO_2$. As used herein, a "brine electrolytic cell" refers to an electrolytic cell wherein there is one single electrolyte (e.g. a concentrated sodium of chloride (NaCl), potassium chloride (KCl), or calcium chloride ($CaCl_2$)) and wherein the products are the corresponding acid and base (e.g. HCl and NaOH for a NaCl electrolyte). Typically, the concentration of the electrolyte (i.e. brine) is about 0.5M to about 5M with higher concentrations being more desirable. Examples of suitable brine electrolytic cells 150 are shown in FIGS. 6A, 6B and 6C.

Figure 6A:
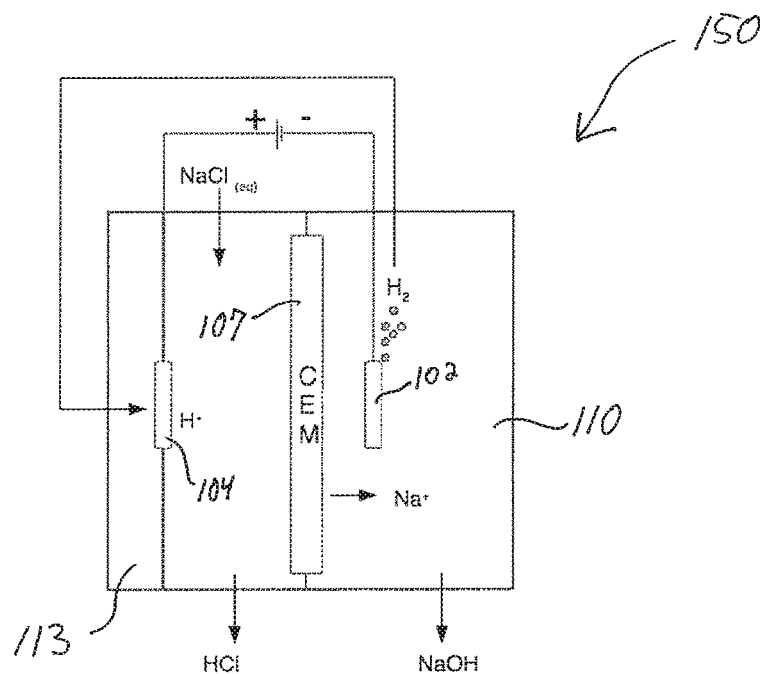
FIG. 6A is a diagram illustrating the functioning of a brine electrolytic cell comprising an hydrogen-oxidizing anode and a cation exchange membrane (CEM), according to one particular embodiment.

FIG. 6A shows a cation exchange version of a brine electrolytic cell 150 comprising an hydrogen-oxidizing anode 104, a cathode 102, and a cation exchange membrane 107 (CEM). Sodium ($Na^+$) cations traverse the membrane 107 to react with hydroxide ($OH^-$) anions produced at the cathode 102. The output is NaOH and HCl.

Figure 6B:
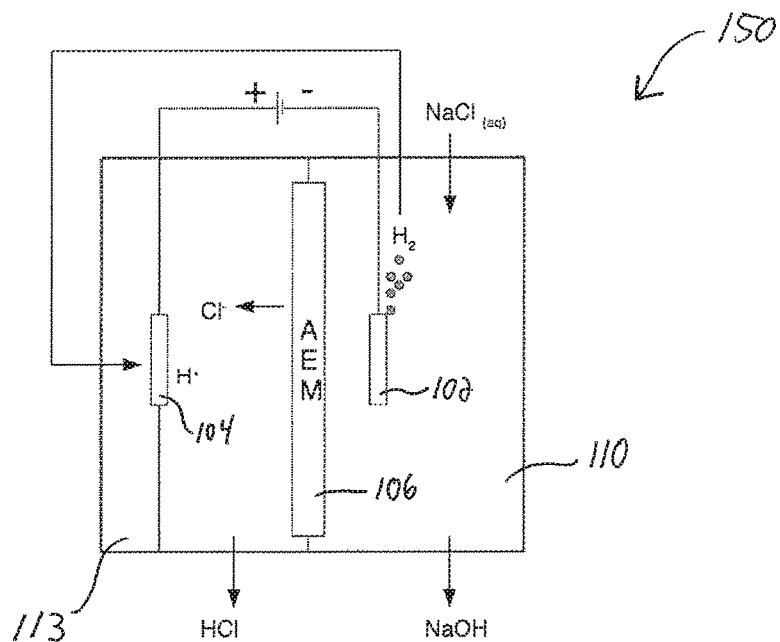
FIG. 6B is a diagram illustrating the functioning of a brine electrolytic cell comprising an hydrogen-oxidizing anode and an anion exchange membrane (AEM), according to one particular embodiment.

FIG. 6B shows an anion exchange version of a brine electrolytic cell 150 comprising an hydrogen-oxidizing anode 104, a cathode 102, and an anion exchange membrane 106 (AEM). Chlorine ($Cl^-$) anions traverse the membrane 106 to meet protons ($H^+$) produced at the anode 104. The output is NaOH and HCl.

Figure 6C:
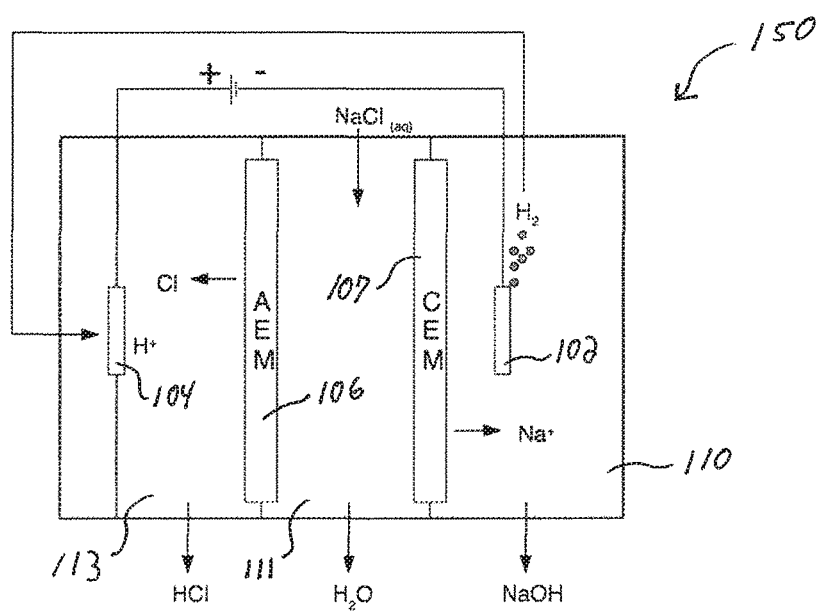
FIG. 6C is a diagram illustrating the functioning of a brine electrolytic cell comprising an hydrogen-oxidizing anode, a cation exchange membrane (CEM), and an anion exchange membrane (AEM), according to one particular embodiment.

FIG. 6C shows a 3-chamber version of a brine electrolytic cell 150 comprising an hydrogen-oxidizing anode 104, a cathode 102, a cation exchange membrane 107 (CEM), and an anion exchange membrane 106 (AEM). The brine electrolytic cell 150 comprises a central chamber 111 which is separated from the anode 104 by the AEM 106 and which is separated from the cathode 102 by the CEM 107. Brine solution is fed into the central chamber 111. Ions from the brine traverse the membranes 106, 107 as in FIGS. 6A and 6B, creating the same products, but reducing the brine concentration in the central chamber 111. The additional benefit is thus the production of fresh water in the central chamber 111. As such, this cell may be used for desalination applications and may be advantageous for processes and installations that include a desalination plant.

Additional brine electrolytic cells that may be used herein, include those known in the art such as those described in U.S. Pat. Nos. 3,531,386; 3,801,698; US patent publication Nos US 2013/0008354, US 2013/0034489; US 2010/0200419; US 2010/0140103; US 2011/0083968; and those of International PCT patent publications WO 2010/008896 and WO 2015/058287. Accordingly, the present invention encompasses methods, process and systems using such known cells to the extent they may be use for producing an alkali-containing catholyte useful for subsequently treating sulfide mine waste and sequestering $CO_2$.

In some embodiments it may be desirable to replace the alkalinity-generating brine electrolytic cell with an alkalinity-generating cell operating by electrodialysis including, but not limited to, bipolar membrane electrodialytic (BMED) cells and electro-electrodialytic (EED) cells. Accordingly, the present invention encompasses methods, process and systems using such electrodialysis cells, particularly in producing an alkali-containing catholyte that is subsequently used for treating sulfide mine waste and sequestering $CO_2$.

BMED Cells:

BMED cells may employ three or more compartments separated by cation exchange membranes and anion exchange membranes and at least one bipolar ion exchange membrane, the latter being incorporated to perform the function of dissociating water into $H^+$ and $OH^-$ ions. The anode and cathode are constructed of any corrosion-resistant conductor such as platinum-coated titanium.

Figure 7A:
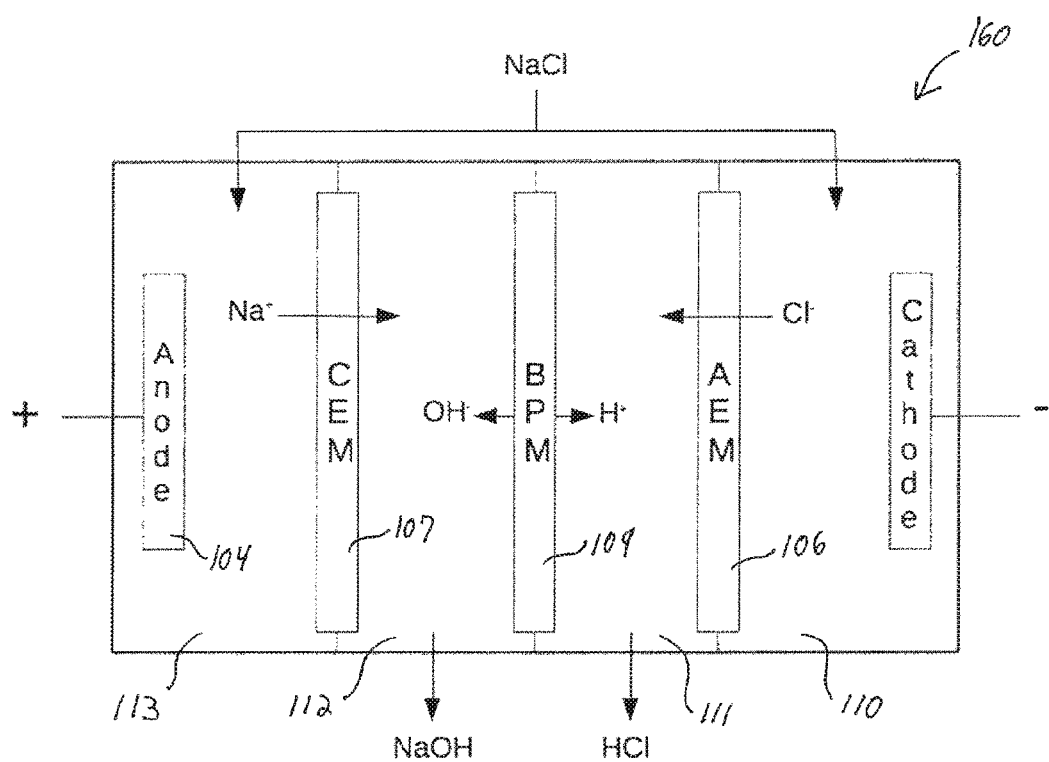
FIG. 7A is a diagram illustrating the functioning of a bipolar membrane electrodialytic (BMED) cell, according to one particular embodiment.

FIG. 7A shows a 4-chamber version of a BMED cell 160 comprising an anodic chamber 113, first 111 and second 112 central chambers and a cathodic chamber 110. The anodic chamber 113 and the second central chamber 112 are separated by a CEM 107. The two central chambers 111, 112, are separated by a bipolar membrane 109 (BPM) comprising an anion selective layer, a cation selective layer and an intermediate junction layer (not shown). The first central chamber 111 and the cathodic chamber 110 are separated by an AEM 106. Like in the brine electrolytic cells, a brine salt aqueous solution (e.g. NaCl typically between 0.5M and 5M with higher concentrations usually being desirable) is fed into the anodic 113 and cathodic 110 compartments of the cell 160. Sodium traverses the CEM 107 into the second central chamber 112. Chlorine traverses the AEM 106 to the first central chamber 111. As electric current is applied to the cell 160, the BPM 109 dissociates water into OH– and H+ ions that pass into the second 111 and first 113 central chambers, respectively. Accordingly, aqueous NaOH and HCl are formed in second 112 and first 111 central chambers, respectively.

Although only one unit comprising four compartments is shown in FIG. 7A, the present invention encompasses additional embodiments where the ion exchange membranes 106, 107 and the bipolar membrane 109 are configured differently. The invention also encompasses embodiments comprising a number of repeating functional units in a stack, all powered by the electric current and potential drop between two electrodes.

EED Cells:

EED cells may employ three or more compartments separated by cation exchange membranes and anion exchange membranes. Two electrodes are constructed of a corrosion-resistant conductor such as platinum-coated titanium.

Figure 7B:
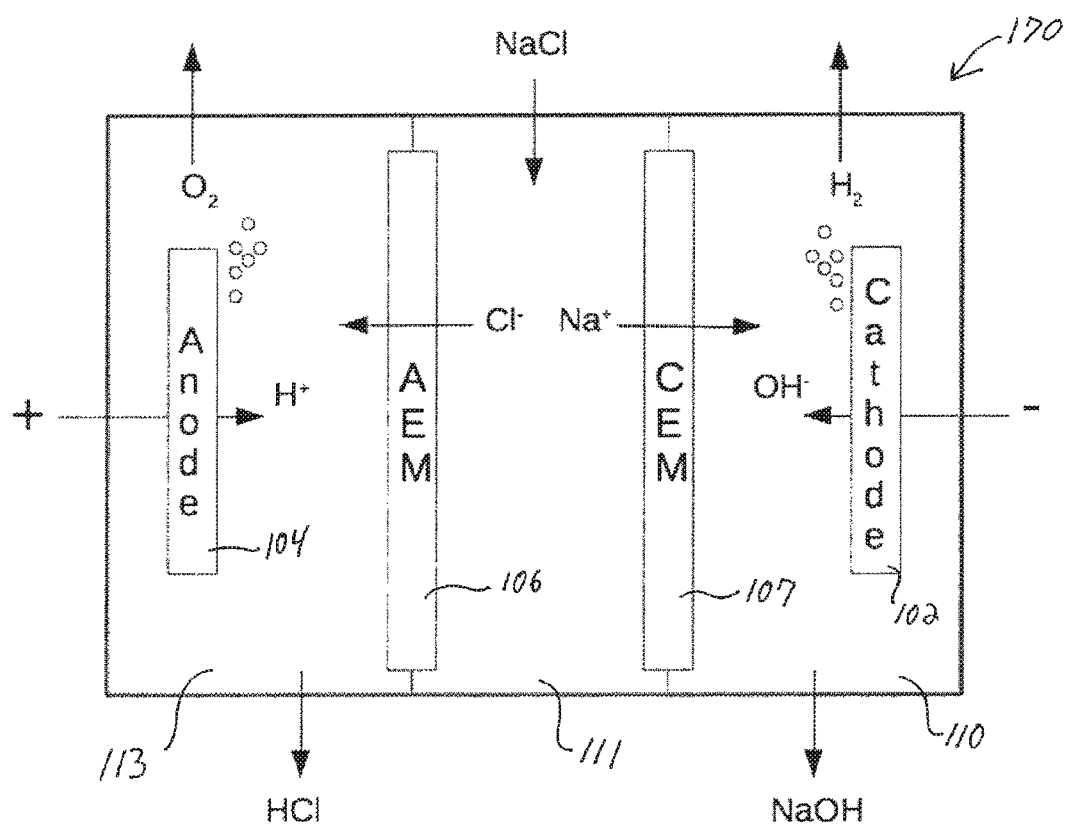
FIG. 7B is a diagram illustrating the functioning of an electro-electrodialytic (EED) cell, according to one particular embodiment.

FIG. 7B shows a 3-chamber version of an EED cell 170 comprising an anodic chamber 113, a central chamber 111, and a cathodic chamber 110. The anodic chamber 113 and central chamber 111 are separated from each other by an AEM 106. The central chamber 111 and the cathodic chamber 110 are separated from each other by a CEM 107. Like in the brine electrolytic cells, a brine salt aqueous solution (e.g. NaCl typically between 0.5M and 5M with higher concentrations usually being desirable) is fed into the central compartment 111 of the cell 170. With applied electrical current, chlorine ions traverse the AEM 106 to the anodic chamber 113 where they encounter $H^+$, whereas sodium ions traverse the CEM 107 to the cathodic chamber 110 where they encounter $OH^-$. Oxygen gas evolves from the anode 104 and hydrogen gas evolves from the cathode 102. Accordingly, aqueous HCl is formed in the anodic chamber 113 and NaOH is formed in the cathodic chamber 110.

If repeating EED units are employed in a stack, two electrodes are required for each repeating unit, unlike the BMED cell. The EED cell evolves hydrogen gas from the cathode, and oxygen gas from the anode and these gases may be used as fuel in a hydrogen-oxygen fuel cell when it is advantageous, or for other purposes.

As can be appreciated, all the configurations of the brine electrolytic cells 150, BMED cells 160 and EED cells 170 can produce an alkali-containing catholyte and an acid-containing anolyte. In particular, the illustrated cells produce sodium hydroxide (NaOH) and hydrochloric acid (HCl), which indicates that the electrolyte is NaCl. As is known, sodium hydroxide is a strong base. According to another aspect of the present invention, such brine electrolytic cells, BMED cells and EED cells are incorporated into processes for the treatment or remediation of Acid Rock Drainage (ARD) or Acid Mine Drainage (AMD) as explained herein after and illustrated in FIG. 8 and FIG. 9.

Although in the present figures the input to the brine electrolytic cells, BMED cells and EED cells are a metal salt such as NaCl, various electrolytes may be used according to the present invention, including, but not limited to, potassium chloride (KCl), calcium chloride ($CaCl_2$), hydrochloric acid (HCl), sulphuric acid ($H_2SO_4$), sodium hydroxide (NaOH), ($Na_2SO_4$) and mixtures thereof. Those skilled in the art can appreciate that the produced acid and base by the catalytic reactions occurring within the cells will vary according to the particular electrolyte. For instance NaCl produces HCl and NaOH, $Na_2SO_4$ will produce $H_2SO_4$ and NaOH, KCl will produce HCl and KOH, $CaCl_2$ will produce HCl and $Ca(OH)_2$, etc. Therefore the present invention encompasses such alternate embodiments.

According to the embodiment illustrated in FIG. 8, a $CO_2$ absorption reactor 130 is operatively connected to the brine 150, BMED 160 or EED 170 cell in order to receive therefrom the alkali-containing catholyte 151 and create a carbonate solution 152 (e.g. a solution comprising sodium bicarbonate and sodium carbonate). Details about uses of a $CO_2$ absorption reactor are provided hereinafter. The carbonate solution 152 produced in the $CO_2$ absorption reactor 130 is transported to another vessel 135 to react with a sulfate metal solution 153 and precipitate solid metal carbonate 154 and sulfate compounds 157. The sulfate metal solution 153 may derive from solid sulfide mine tailings 155 or waste pyrite concentrate and these may be leached or not with the aid of iron-oxidizing bacteria in a heap or reactor 156. The sulfate metal solution 153 could also be directly supplied from ARD and/or any other metal sulfate source. The relatively stable precipitate particles 154, 157 are removed through traditional solid-liquid separation methods such as thickening. Details about the $CO_2$ absorption reactor and the precipitation and thickening process are provided hereinafter.

Compared to FIG. 8, the process of FIG. 9 further comprises a $SO_2$ reduction reactor 140. In one embodiment, the reactor is a $SO_2$ catalytic reduction column 140. This $SO_2$ reduction reactor acts to improve the efficiency of carbonate production by reducing trivalent metal ions ($3^+$ oxidation state) to divalent metal ions ($2^+$), the latter being the species desired for carbonate precipitation (e.g. reducing ferric iron to ferrous iron). In addition, the $SO_2$ reduction reactor 140 scrubs sulfur dioxide from a $SO_2$ containing flue gas 144. According to one embodiment, the $SO_2$ reduction reactor 140 is a $SO_2$ catalytic reduction column and that column is operatively connected to (i) a source of $CO_2$-rich gases comprising also $SO_2$ 144, and (ii) to a source of aqueous metal sulfate 153 so that it can reduce metallic compounds found therein to produce a solution comprising reduced metal sulfate compounds 145. Like the previous figure, the sulfate metal solution 153 may derive from solid sulfide mine tailings 155 or waste pyrite concentrate and these may be leached or not with the aid of iron-oxidizing bacteria in a heap or reactor 156. The sulfate metal solution 153 could also be directly supplied from ARD and/or any other metal sulfate source. The flue gas scrubbed of $SO_2$ 146* is fed to the $CO_2$ absorption reactor 130 and the solution comprising reduced sulfate compounds 145 is transported to another vessel 135 for carbonate precipitation. More details about the $SO_2$ reduction reactor are provided hereinafter.

Precipitation and Thickening

Figure 10:
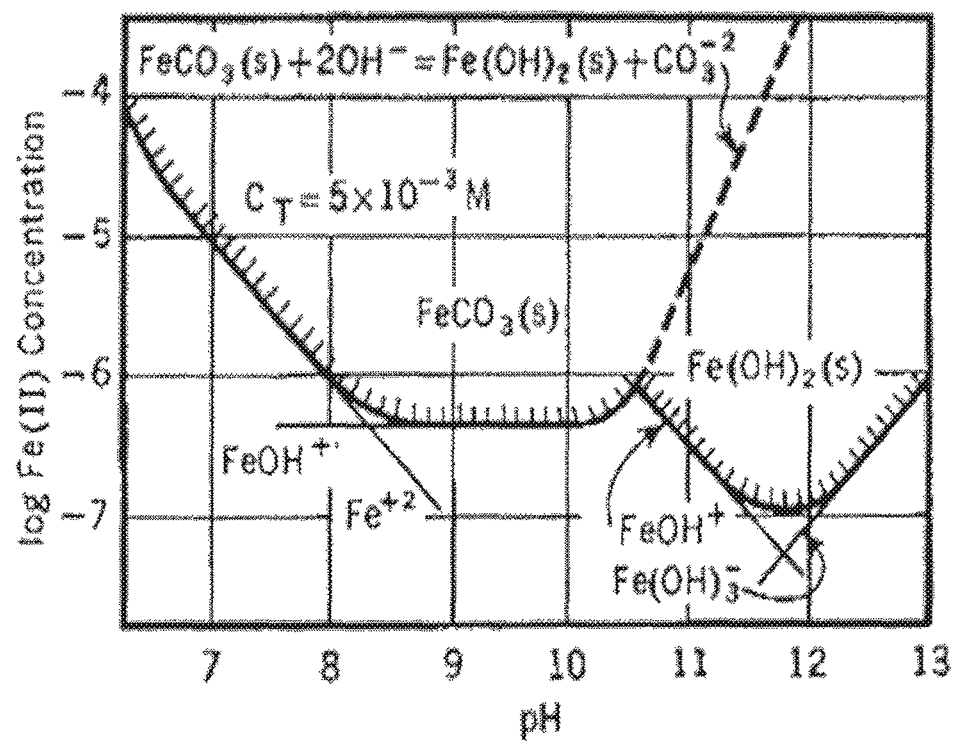
FIG. 10 is a graph showing solubility of ferrous iron in carbonate-bearing waters. Taken from Singer & Stumm, 1970.

As illustrated in FIGS. 8 and 9, the carbonate solution 152 produced in the $CO_2$ absorption reactor 130 is transported to another vessel 135. The purpose of the vessel 135 is to allow proper mixing and a chemical reaction between (1) the carbonate solution 152 exiting the $CO_2$ absorption reactor 130 (e.g. $NaHCO_3$ or $Na_2CO_3$, typically pH 10-14) and (2) the metal-containing acidic sulfate solution 153, 145, (typically pH 1-3). Such mixing will increase the pH of the metal-containing acidic solution 153, 145, thereby causing precipitation of solid metal carbonate compounds 154 and a metal sulfate compound 157 such as sodium sulfate ($Na_2SO_4$). For instance, as illustrated in FIG. 10, for the formation of siderite ($FeCO_3$) a pH of 7-10 is ideal, as well as suitable containment in a vessel that limits exposure to atmospheric oxygen thereby preventing $Fe^{2+}$ from oxidizing.

Any suitable recipient or vessel can be used for receiving the carbonate solution and the acidic sulfate solution for the precipitation and thickening steps. Preferably, the vessel should be made of, or coated with, a non-reactive material (e.g. high density polyethylene (HDPE), PTFE, acrylic, titanium, ceramic.) The vessel may be operatively connected to the $CO_2$ absorption reactor and/or to the source of acidic sulfate using non-reactive pipes with flow regulators and/or pumps that can be controlled by the process control system. In preferred embodiments, the acidic sulfate solutions are sourced from sulfide mine wastes comprising iron (e.g. $FeSO_4$, $Fe(OH)_3$, $Fe_2(SO_4)_3$). However, the systems and processes of the invention are amenable to treatment of other compounds comprising metallic divalent cations such as lead sulfate ($PbSO_4$), zinc sulfate ($ZnSO_4$), nickel sulfate ($NiSO_4$), copper sulfate ($CuSO_4$), etc.

The solid metal carbonate compounds 154 that have precipitated according to the processes described herein may be removed from the vessel 135 or recovered using any suitable technique or method of solid-solid separation. In one embodiment, the precipitates are recovered using a filter (e.g. a standard filter paper and/or cloth, or a vacuum assisted filter press apparatus). In one embodiment, the precipitates are recovered by thickening, for instance by using a large diameter thickener vessel with a conical bottom and rake system like those commonly found in mineral processing operations. A flocculant 136 (e.g. isinglass, sodium silicate) may also be added to promote thickening and separation of solid particles from the liquids.

$CO_2$ Absorption Reactor

As illustrated in FIGS. 6 to 9, the electrochemical cells 150, 160 and 170 described herein are a source of alkalinity and these cells may be operatively connected to a $CO_2$ absorption reactor 130. According to the illustrated embodiments, the $CO_2$ absorption reactor 130 receives the alkali-containing catholyte 151 produced by the electrochemical cells 150, 160 and 170 (e.g. NaOH solution) and it receives also a $CO_2$-rich gas mixture 146, 146* (e.g. a $CO_2$-enriched gas mixture from an industrial plant) to create a carbonate solution 152 (e.g. a solution comprising sodium bicarbonate and sodium carbonate). The carbonate solution 152 is then used for precipitation and thickening in a vessel 135 (FIGS. 8 and 9). The carbon-dioxide gas mixture 146, 146* contains $CO_2$ and it may also contain additional gaseous compounds, including but not limited to, sulphur dioxide ($SO_2$), water in steam form, and nitrogen.

As is known, $CO_2$ gas does not react directly with hydroxide ($OH^-$). However, hydroxide will react with carbonic acid ($H_2CO_3$) formed in small amounts by reaching equilibrium with dissolved $CO_2$ gas in solution:

$$CO_{2(aq)} = 650 \cdot [H_2CO_3] \text{(Lower, 1999)}$$

With addition of hydroxide, carbonic acid will be consumed and $CO_2$ will continue to dissolve to maintain equilibrium:
a) $CO_{2(aq)} + H_2O \leftrightarrows H_2CO_3$
b) $H_2CO_3 \leftrightarrows HCO_3^- + H^+$
c) $HCO_3^- \leftrightarrows CO_3^{2-} + H^+$ It is apparent from the above equilibrium reactions that the addition of 2 $OH^-$ from the electrolytic cells will react with $2H^+$ and push the equilibrium toward $CO_3^{2-}$, thereby allowing for carbonate precipitation if divalent metal anions are present. The $OH^-$ anions will increase the pH and, if $CO_2$ is made to react with aqueous $OH^-$ in correct proportion, bicarbonate and carbonate-species will be dominant.

For example, from the cathode reaction we produce $OH^-$:

$$2H_2O + 4e^- \leftrightarrows H_2 + 2OH^-$$

Sodium ions in the cathode chamber associate with hydroxide anions:

$$Na^+ + OH^- \leftrightarrows NaOH$$

Sodium hydroxide reacts with carbonate anion in the $CO_2$ absorption reactor:

$$2NaOH + CO_3^{2-} + 2H^+ \leftrightarrows Na_2CO_3 + 2H_2O$$

Divalent iron carbonate precipitates by combination of sodium carbonate and ferrous sulfate:

$$Na_2CO_3 + FeSO_4 \leftrightarrows FeCO_3 + Na_2SO_4$$

As is known, pressure and temperature have an important effect on the carbonic acid concentration. For instance, concentration of carbonic acid increases with higher $CO_2$ pressure. Also, lower temperature increases solubility of carbon dioxide (as with all gases) (Lower, 1999). Accordingly, the $CO_2$ absorption reactor is preferably operated at low temperature (e.g. at about 0° C. to about 25° C.), at high $CO_2$ pressure (e.g. about 100 kPa to about 700 kPa) and at high pH (e.g. about pH 10 to about pH 14). Hot flue gases may require cooling at a desired temperature (e.g. using a heat exchanger) to optimize $CO_2$ absorption.

Preferably, the $CO_2$ absorption reactor should be made of, or coated with, a non-reactive material suitable for containing a strong base (e.g. polyvinyl chloride (PVC), PTFE, HDPE, or ceramic). Preferably, the $CO_2$ absorption reactor is configured to encourage rapid chemical reactions. Similarly, $CO_2$ and/or the alkali-containing catholyte should be introduced into the reactor in a format that encourages rapid chemical reactions. Examples of possible operating mechanisms of the $CO_2$ absorption reactor include, but are not limited to, spraying/misting the alkali-containing catholyte through a chamber of flue gas, bubbling flue gas $CO_2$ through the alkali-containing catholyte, injecting a flue gas into a packed column with concurrent inflow of the alkali-containing catholyte, ambient $CO_2$ absorption through high surface area interaction with the alkali-containing catholyte, etc. In one embodiment, the $CO_2$ absorption reactor is shaped like a cylindrical column. In one embodiment, the $CO_2$ absorption reactor is shaped like a cylindrical column and $CO_2$ is bubbled through the alkali-containing solution using a ceramic diffuser of suitable length to allow maximum $CO_2$ absorption.

$SO_2$ Reduction Reactor

The electrochemical cells 150, 160 and 170 described herein may also be operatively connected with an optional sulfur dioxide ($SO_2$) catalytic reduction reactor 140. The role of the $SO_2$ reduction reactor is to improve the efficiency of carbonate production by reducing trivalent metal ions ($3^+$ oxidation state) to divalent metal ions ($2^+$ oxidation state) (e.g. ferric iron to ferrous iron). For instance, optional circulation of leachate feedstock through such reactor may increase concentrations of the species available for carbonate precipitation (e.g. maximizing ferrous ion concentration for precipitation as siderite ($FeCO_3$)). This reduction reactor also reduces harmful $SO_2$ concentrations in the flue gases.

In embodiments, the $SO_2$ reduction reactor is be made of, or coated with, a non-reactive material (e.g. HDPE, PTFE, PVC and other plastics may be suitable depending on temperature and concentration of sulfurous acid and sulfuric acid in solution). Preferably, the $SO_2$ reduction reactor is configured to encourage rapid chemical reactions. Similarly, $SO_2$ and/or the metal ion containing solutions should be introduced into the reactor in a format that also encourages rapid chemical reactions. Examples of possible operating mechanisms of the $SO_2$ reduction reactor include, but are not limited to, spraying/misting the metal ion containing solution through a chamber of flue gas, bubbling flue gas through the metal ion containing solution, injecting flue gas into a packed column with concurrent inflow of metal ion containing solution. Preferentially the $SO_2$ reduction column will include a catalyst compound to improve reaction rates.

In one embodiment, the $SO_2$ reduction reactor is shaped like a column or like a reactor bed. Preferably the column is dimensioned (sufficient length and/or width) for ensuring a high reaction rate and for ensuring short, efficient flow path of gases and/or for completely scrubbing sulfur dioxide from a constant flow of flue gas.

In embodiments, flue gases are bubbled through a metal ion containing solution. The flue gas may contain dominantly $CO_2$ and trace amounts of $SO_2$. In embodiments, the temperature of the flue gas is about 25° C. to about 75° C. or less, in order to maximize $SO_2$ solubility. However it may also be desirable to operate at the temperatures between 150° C. and 600° C., depending on the temperature of exiting flue gas and depending on the working properties of the catalyst employed.

In embodiments, the $SO_2$ reduction reactor comprises a catalyst to improve the speed of the reaction, (e.g. by providing more nucleation sites for the reaction to take place). Examples of catalyst that may be used include, but are not limited to, platinum, activated carbon, and other common catalysts used in the industry like ruthenium, rhodium, vanadium pentoxide (at temperatures greater than 400° C.). Preliminary experiments show that catalysis by activated carbon improves reaction speed by at least 500% (see Example 2). The catalyst may need to be recharged or reactivated after prolonged used. In one embodiment, the $SO_2$ reduction reactor comprises a chamber filled with porous, high specific surface area, activated carbon.

According to particular embodiments (e.g. like those illustrated in FIG. 9), this optional step involves passing a $SO_2$-containing gas mixture 144 (e.g. flue gas deriving from combustion of liquid natural gas, $H_2S$ from sour natural gas production, diesel, and/or coal, or any other gas containing elevated levels of $SO_2$) through a metal sulfate solution 153 (e.g. an iron sulfide leachate) in the $SO_2$ reduction reactor 140. $SO_2$ will react with trivalent metal ions (3+ oxidation state, e.g. $Fe^{3+}$) to produce divalent metal ions (2+ oxidation state, e.g. $Fe^{2+}$) in solution. Divalent metal (e.g. $Fe^{2+}$) is the required valence state for metal carbonate precipitation. Employing such a technique will have the benefits of: (1) scrubbing $SO_2$ from the waste gas; and (2) making more metal available in solution for metal carbonate precipitation, thereby improving downstream reaction efficiency of precipitation (FIG. 9).

For instance, the $SO_2$ reduction reactor 140 may be fed acid rock drainage (ARD) or a similar acidic aqueous solution derived from iron sulfide tailings. Such acidic solution may have a pH of about 1-3 and contain $Fe^{2+}$, $Fe^{3+}$, $SO_4^{2-}$ and H+ as dominant species.

Figure 11:
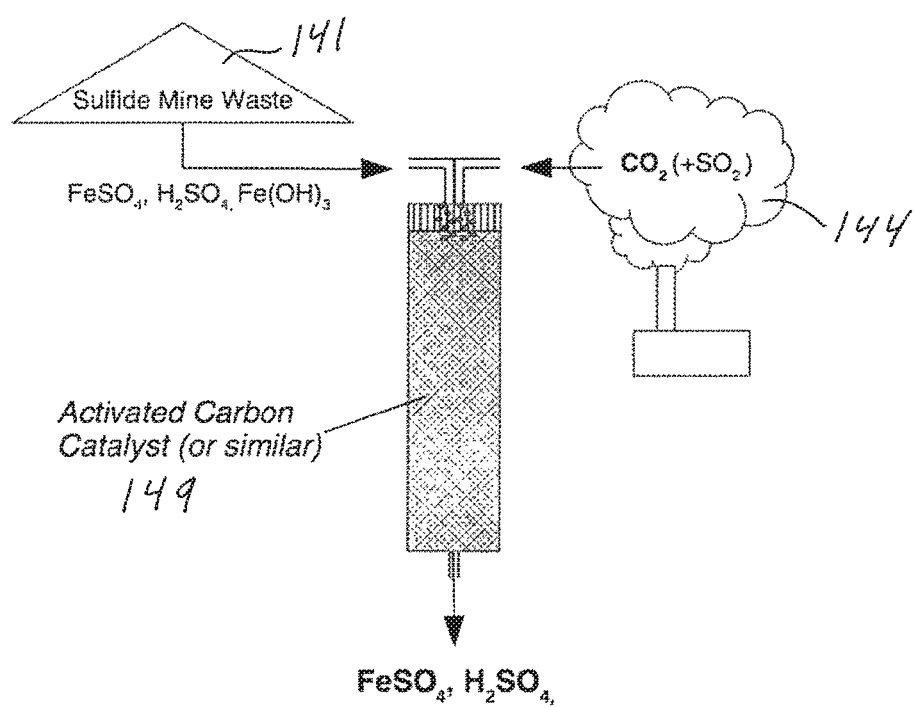
FIG. 11 is a diagram of a particular catalytic $SO_2$ reduction column using activated carbon as a catalyst, according to one particular embodiment.

FIG. 11 illustrates one particular embodiment of a $SO_2$ reduction column 140* according to one particular embodiment, the column 140* comprising activated carbon 149. As shown, the column 140* is fed with sulfide mine waste 141 comprising trivalent iron in the form of iron oxy-hydroxides [e.g. $Fe(OH)_3$) or sulfates (i.e. $Fe_2(SO_4)_3$)] to produce divalent iron in a sulfate form (i.e. $FeSO_4$). The output of the reaction is directed to a precipitation and thickening vessel 135 (e.g. FIG. 9).

In the illustrated embodiment, the sulfide mine waste 141 comprises trivalent iron (e.g. $Fe(OH)_3$, $Fe_2(SO_4)_3$) to produce divalent iron in a sulfate form (e.g. $FeSO_4$). However, it is envisioned that the present invention may by useful for reducing other metals with both divalent and trivalent oxidation states such as Ti(III) to Ti(II), Cr(III) to Cr(II), Mn(III) to Mn(II), Co(III) to Co(II), Ni(III) to Ni(II), Cu(III) to Cu(II), Zn(III) to Zn(II), etc.

Without wishing to be bound by any particular theory, the following provides some details about the chemical reactions involved within the $SO_2$ reduction reactor. For instance, a small percentage of $SO_2$ in flue gas (largely composed of $CO_2$) may reduce $Fe^{3+}_{(aq)}$ to $Fe^{2+}_{(aq)}$ by the following suggested reactions:

a) The solution of sulfur dioxide in water:

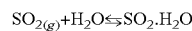

b) Dissolved $SO_2$ gas forming sulfurous acid:

c) The reduction of the ferric ion by hydrogen sulfite:

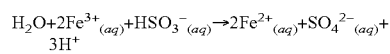

Reaction a) involves the dissolving of $SO_2$ gas and reaction b) is the reaction of aqueous dissolved $SO_2$ with water. Finally, in reaction c) the $HSO_3^-$ anion reduces ferric iron, producing ferrous iron, sulfate, and protons. For every two ferric iron atoms reduced to ferrous iron, three $H^+$ are released and must be neutralized with $OH^-$ later in the process (e.g. the $CO_2$ absorption reactor 130 as shown in FIG. 9). Feasibility of the overall $SO_2$ reduction process is demonstrated in Example 2.

Alternative methods and techniques can be envisioned to reduce trivalent metal ions to divalent metal ions, according to the principles of the present invention. One such alternative comprises the addition of $H_2S$ from sour natural gas production to burning hydrocarbons such as natural gas or coal, to oxidize $H_2S$ to $SO_2$ by the reaction $H_2S_{(g)} + 3/2 O_{2(g)} \leftrightarrows SO_{2(g)} + H2O_{(l)}$. Another alternative comprises exposing the metallic solution to UV light in order to reduce trivalent metal ions to divalent metal ions (for example, by the reaction suggested by Vigânico et al., 2011: $Fe^{3+}_{(aq)} + H_2O_{(l)} + UV \rightarrow Fe^{2+}_{(aq)} + H^+_{(aq)} + OH^-_{(aq)}$). Such alternative methods and techniques may be useful when the natural sulfur-abundance of fossil fuels consumed in power generation is insufficient for complete reduction of the trivalent metal and/or the complete capture of $CO_2$, or when it is not feasible to reduce ferric iron in a particular case.

As can be appreciated there are a number of benefits to the revised processes contemplated and described herein. For instance, these methods and systems provide for an accelerated and more optimized set of reaction conditions. This will allow a more rapid and more effective treatment of sulfide mine waste. The present methods and systems are also able to treat Acid Mine Drainage directly, instead of requiring a supply of solid metal sulfides. The present methods and systems broaden applicability of existing remedial strategies and enables treatment of acid mine drainage and sequestration of carbon dioxide in situations where runoff is the primary negative environmental challenge but the reactive sulfides themselves cannot be treated (e.g. a closed underground mine with leakage out the access portal; or when sulfides are present in the remaining wall rocks of a closed open pit mine). Optionally, the present methods and systems utilizes $SO_2$, which is toxic and present in some fossil fuel fired industrial plant off-gases, to improve reaction rates and the overall process.

EXAMPLES

Example 1

Feasibility of Reacting $CO_2$-Rich Flue Gas with Sulfide Mine Tailings to Form Stable Carbonates These following experiments involved exposing samples of material with elevated levels of sulfide minerals to $CO_2$ gas under various conditions, for varying periods of time, and then using different characterization methods to determine if carbonates have formed.

The material used in most of these experiments is the reference material CPB-2 available from Natural Resources Canada. CPB-2 is a lead flotation concentrate from the former Sullivan Mine concentrator at Kimberley, British Columbia, Canada. The material is a very fine, black powder. The mineral species contained include galena PbS (64.7%), anglesite $Pb(SO_4)$ (12.1%), sphalerite ZnS (10.1%), pyrrhotite Fe1-xS (6.8%), pyrite $FeS_2$ (4.9%), plus various silicates and other phases at <0.6%. Elemental composition is approximately 63.5% Pb, 18% S, 6.0% Zn, 7.1% Fe, with other elements contributing the remainder. Powder X-ray diffraction measurements of untreated material confirms galena, anglesite and sphalerite as the dominant phases, with minor peaks from pyrrhotite and pyrite being more difficult to distinguish. No carbonate phases are detectable in the untreated material.

The test material (and any other components) was placed in a sealed vessel with a gas in-flow, attached to a cylinder of $CO_2$, and out-flow. The gas cylinder was then opened to allow $CO_2$ to enter the vessel and displace air through the out-flow; after 20-60 seconds the gas cylinder was closed and the in-flow and out-flow clamped shut. The sealed vessel containing $CO_2$ and the tailings powder was then left to react for varying periods of time at temperatures between room temperature (24° C.) and 300° C. The vessel was heated by a standard uncalibrated laboratory hot plate, and the temperature monitored by a temperature sensor with a thermocouple wire. The temperature in experiments using the hot plates varies within a range of 10° C.

In experiments 1-10, the vessel used was an Erlenmeyer flask sealed with a two-holed rubber stopper with glass tubing for the gas in- and out-flow. The stopper however did not provide an adequate seal and $CO_2$ was lost over periods greater than 24 hours. Later experiments used a custom-built vessel consisting of a flanged lid and body. The flanges are made with ground glass and when coated with a layer of grease (petroleum jelly was used) and clamped tightly, this provides an adequate seal to prevent $CO_2$ loss over the course of an experiment.

Two methods were used to characterize the experimental products: powder X-ray diffraction (PXRD), and the scanning electron microscope (SEM) equipped with an energy-dispersive X-ray spectrometer (EDS). PXRD allows identification of individual crystalline phases present in the material. However, phases making up less than around 10% of the total can be difficult to distinguish, and identifications of minor lines in a PXRD pattern can be less reliable than those of major lines. Non-crystalline phases such as ferrihydrite and other early stages which may precipitate from a solution cannot be detected as they lack a well-defined crystal structure.

Samples were examined with the SEM to inspect particles at the microscopic scale for signs of alteration and to identify local changes in chemistry. EDS allows identification of the chemical elements present in small areas (on the order of 10-100 μm in diameter) of the sample. SEM with EDS potentially allows identification of phases too amorphous or present in too small quantities to be identified, such as those which may form as rims on existing particles. A significant drawback of the EDS is that the equipment is much less sensitive to elements lighter than sodium, including carbon, which limits its ability to distinguish carbonates from oxides or sulfides containing the same heavier element. In addition, most methods of affixing the sample powder to a mount for insertion in the SEM are carbon-based, which leads to a potential carbon peak from the background. Due to these two factors, a particular spot being analyzed must therefore produce a strong carbon peak in order to be unambiguously identified as containing carbonate.

The first series of experiments conducted cover those conditions which are easiest to vary: temperature, presence or absence of water (i.e., dry powder vs. a solution), solution pH, $CO_2$ vs. air, and agitation of the solution. The second series of experiments are ongoing, and will include testing variations such as introducing $SO_2$ gas or other substances as potential catalysts and passing an electric current through a mixture of the tailings powder and water.

Experiments 1 and 2 consisted of 50 mL deionized (DI) water plus 20 g and 10 g of sample powder, respectively, under $CO_2$ at room temperature with constant stirring of the mixture. There was no visual difference in the mixtures after 5 days. The mixtures were then heated in air overnight at around 90° C. to remove the water. After heating overnight experiment 2 still had some liquid left with no other apparent change, while experiment 1 was completely dry with red and grey-white solids formed on the top of the black sample powder (the latter formed around the stir rod which was left in the flask). There was also a sharp odour and discolouration on the sides of the flask consistent with $SO_3$ formation. The red solid appeared to be poorly-crystalline iron oxyhydroxide while the grey-white solid appeared to be a mix of iron oxyhydroxide and a platey calcium-rich phase. The source of the calcium is uncertain, as the reported Ca content of the tailings powder is only 0.07%. PXRD of both experiments showed very little change from the unaltered powder. PXRD of experiment 1 shows a small line at low angles matching the calcium-bearing zeolite chabazite, which may be the calcium-rich phase.

These experiments show that the sulfides in the sample powder, particularly the iron sulfides, can be converted to oxides or oxyhydroxides with exposure to heat, air and water, i.e., S is replaced with O or OH. This suggests that in a higher $CO_2$ atmosphere, reactions may occur which replace S with $CO_3$ instead.

Experiments 3 and 4 involved heating 10 g of sample powder dry at around 150° C. for 48 hours under $CO_2$ and air, respectively. In both experiments, an opaque white substance formed on the sides of the flask within about 15 minutes. Both SEM/EDS and PXRD confirmed this substance was elemental sulfur. Elemental sulfur is not reported in the certified analysis of the sample powder, nor was it detected in the unaltered powder by PXRD or SEM, so it may be liberated from one of the sulfide phases. After the experiment, the bulk powder was visually unaltered and showed no change in PXRD or SEM/EDS.

Experiments 5 through 11 were analyzed using SEM/EDS only, as those visible changes in experiments 1 to 4 did not contribute phases detectable by PXRD. We concluded that any changes likely to be induced would probably be surface alterations of grains that could be better detected with the SEM. This did not prove to be the case.

Experiment 5 involved heating 10 g of sample powder with 2 mL DI water at around 150° C. for 48 hours under air (with no stirring). As in experiments 3 and 4, a white film of elemental sulfur quickly formed on the sides of the vessel; in this case evaporation and condensation tended to wash the sulfur back down into the sample powder. After 48 hours the powder was agglomerated and visible red iron oxide formed on some spots of the surface. SEM/EDS analyses of experiment 5 were very similar to those of experiments 3 and 4 over most of the surface. Analyses near the red patches on the surface confirmed the presence of iron oxide. Again no signs of carbonate formation were seen. Samples from near both the edge and the centre of the flask were examined, as the surface consistency appeared slightly different in texture and colour, but EDS analyses showed no significant chemical difference.

Experiments 6A and 6B consisted of 26 mm×46 mm glass slides coated with a thin layer of sample powder heated under $CO_2$ at around 150° C. for 24 hours and one week, respectively. The goal in these experiments was to present a higher ratio of potentially reactive surface area to mass of material for easier characterization. Experiment 8 was similar, but heated at around 300° C. for two weeks. None of the three slides showed any visual change and SEM/EDS analyses did not detect any signs of carbonate formation.

Experiment 7 consisted of a whole piece of pyrite with one freshly cut, polished (hence presumably oxide-free) surface, heated under $CO_2$ at around 150° C. for one week. After one week, an iridescent film was visible on part of the cut surface. At this time, mechanical difficulties with the department's SEM lead to a delay in characterizing the samples, and in the interim the film on the treated pyrite faded and the sample was lost among other non-treated samples.

Experiments 9 and 10 involved mixtures of the sample powder with solutions of different pH. Note that carbonate formation in solution is expected to be favoured at high (basic) pH. Experiment 9 consisted of 6 g of sample powder with 10 mL of 1% HCl solution under $CO_2$ at room temperature for 10 days, with constant stirring. Experiment 10 consisted of 5 g of tailings powder with 10 mL of 0.01 M NaOH under $CO_2$ at room temperature for 10 days, with constant stirring. The mixtures were allowed to dry overnight uncovered in air. SEM/EDS analyses of both products did not detect any signs of carbonate formation.

In the longer term, high temperature experiments 6B, 7 and 8 it was apparent on opening the Erlenmeyer flask that $CO_2$ had escaped over the course of the experiments (in that a lit match inserted in the flask did not extinguish as it would in a pure $CO_2$ environment). In experiments 9 and 10 the rubber stopper was coated with glycerin, which together with low temperatures improved gas retention. At this point we began looking for a custom-built vessel with a better sealing mechanism.

Experiments 11 and 12 were the first with the new vessel, described above, and were intended as repeats of the simplest experiments with a more reliable seal. In experiment 11, 5 g of dry sample powder were heated at around 250° C. for 9 days under $CO_2$. The vessel appeared to retain the gas over the course of the experiment. Within 50 minutes the entire interior of the vessel was coated with a white film of elemental sulfur, and as the experiment progressed it was noted that the bottom edge of this film moved up the vessel (i.e., away from the heat source). Examination with the SEM/EDS did not show any definite signs of carbonate formation (i.e., strong C peaks or signs of alteration on grains), however quantitative EDS analysis appeared to suggest that many grains contained less S than expected.

Experiment 12 consisted of 2.5 g of sample powder with 10 mL DI water under $CO_2$ at between 50-60° C. for 10 days, with constant stirring. The presence of condensation on the sides of the vessel obscured any signs of elemental sulfur. After 10 days, the mixture was brown-grey, significantly lighter in colour than at the start, although not homogenous; material taken from near the surface of the mixture was darker in colour, closer to that of the unaltered powder. Samples were dried uncovered in air overnight. PXRD of the lightest-coloured material, taken from the middle of the mixture, showed strong lines unambiguously due to cerussite, $PbCO_3$, as well weaker lines ascribed to smithsonite, $ZnCO_3$, in addition to galena, anglesite, sphalerite and pyrite also present in the unaltered sample powder. No lines attributable to pyrrhotite were detected. SEM/EDS analysis of the sample, however, showed a similar result to that of experiment 11, with the exception of presence of islands of pure (likely amorphous) S sitting on the surface of the dried powder. Those C peaks seen in the EDS were not significantly different from those seen in previous samples, suggesting that EDS is not a reliable method of searching for carbonates.

Experiment 13 was similar to experiment 12, but with 10 ml 0.01 M NaOH instead of water. After 14 days, the colour of the mixture was lighter than the starting material but not as light as in experiment 12. PXRD of the end product again showed strong lines due to cerussite as well as lines attributable to leadhillite, $Pb_4(CO_3)_2(SO_4)(OH)_2$, presumably formed from anglesite as the cerussite is formed from galena. No lines attributable to smithsonite, pyrite or pyrrhotite are detectable. The apparent lack of iron phases in patterns of both experiments 12 and 13 is odd, perhaps suggesting conversion to non-crystalline or poorly-crystalline iron oxyhydroxide phases.

SEM/EDS analysis of experiment 13 was similar to experiment 12 but without any S islands. The sample did however show several large (100-200 μm) sprays of calcium-rich crystals, which EDS suggests are calcium sulfate. The shapes of the crystals appear as if they had grown in place on the powder. The PXRD pattern also showed small peaks from gypsum, $Ca(SO_4)(H_2O)_2$. A small number of similar crystals were also seen in experiment 12, but in experiment 13 they were larger and more numerous.

Experiment 14 repeated experiment 12 as closely as possible to check for the repeatability of carbonate formation. The temperature and appearance of the mixture was monitored continuously over the 10 day run. After 2 days the colour of the mixture had lightened noticeably and after 7 days brown particles could occasionally be observed splashing on the side of the vessel. On opening the mixture was not as light in colour as experiment 12 was, but was still lighter than the starting material. The mixture was again dried in air, but this time partly covered in the fumehood rather than open in the lab to reduce possible contamination by dust.

PXRD patterns were measured for material from both the bulk of the mixture, near the surface of the mixture, and material scraped or washed from the sides. The bulk material and that from the sides were very similar and all show patterns from the Pb carbonates cerussite and leadhillite, as well as galena, anglesite and sphalerite. The pattern from the surface material showed very strong lines from gypsum (hydrated $CaSO_4$) as well as lines from elemental sulfur, anhydrite (water-free $CaSO_4$), lead oxide and chabazite (Ca-bearing silicate). Well-formed crystals of elemental sulfur were also observed with the SEM. While the CPB-2 powder is reportedly Ca-poor, the consistent appearance of a chabazite line at low angles in the PXRD patterns in both reacted and unreacted material suggests that Ca is present in the system, and chemically active in the formation of sulfates.

Experiment 15 consisted of 2.5 g of ground pyrite powder with 10 mL DI water under $CO_2$ at between 50-60° C. This experiment was scheduled to run for 10 days, much like experiments 12-14, but was stopped after approximately 3 days when the acidic solution formed caused corrosion of the thermocouple wire. PXRD of the products showed formation of rozenite, hydrated $Fe(SO_4)$, a ferrous oxyhydroxide phase analogous to gibbsite, and minor amounts of elemental arsenic, likely liberated from the pyrite.

Experiment 16 and following were run with a standardized tailings powder, RTS-3A, also obtained from Natural Resources Canada. RTS-3A is sample of sulfide mill tailings obtained from Waite Amulet Mine, near Noranda, QC, Canada. The mineral species contained include 16.6% pyrrhotite and 5.0% pyrite in addition to a variety of common silicate mineral phases (elemental composition Fe 20.5%, Si 18.3%, S 9.6%, Al 5.1%, Mg 2.5%, Ca 2.1%, other elements <1%; note that a $C/CO_2$ content of 0.04% is reported for this material). This experiment was run with 2.5 g of the new RTS-3A powder as well as 10 mL of deionized water. The experiment was once again run under $CO_2$ and kept at a temperature ranging from 50-60° C. for four days. After two days, the solution began to develop an orange hue, which intensified throughout the day; the solution also became significantly lighter in colour. On the fourth day, the thermocouple was no longer functioning. Upon further inspection, it was discovered that it had been corroded; likely due to acid formation in the solution which had a pH of 3.1 approximately five minutes after the vessel was opened. Samples from the bulk material as well as those from the material washed from the sides of the vessel were analyzed under PXRD. While results from the PXRD of the products showed no formation of carbonates, it did show peaks for goethite (FeOOH), which explained the colour change, as well as peaks corresponding to elemental sulfur. It appears as though pyrite had replaced pyrrhotite as the primary iron oxide as there were no pyrrhotite peaks found in the samples taken from after the experiment was run.

In an effort to minimize acid production, experiment 17 was run using 2.6 grams of RTS-3A without the addition of any water. The experiment was run under $CO_2$ at an average of 200° C. for five days. Within the first 10 minutes of the experiment, a white film formed around the base of the vessel which slowly spread while some of it, near the base, turned from white to bright yellow. After approximately 30 minutes, the entire inside of the vessel was covered by a white film, with some yellow persisting near the bottom. Approximately one hour after the commencement of the experiment, the yellow had begun to fade. By the 1.5 hour mark, the yellow colouring had more or less disappeared. By the end of the experiment, the sulfur seemed to have condensed from a thick diffuse coating to a thinner, patchier coating with some well-defined crystals visible to the naked eye. After five days, the heat was shut off and the experiment was left to cool for 1.5 hours until the temperature had dropped to 27° C. at which point it was removed and the vessel was opened. While the powder itself seemed to initially darken in colour as the sulfur film formed, at the end of the experiment, as it cooled to room temperature, it seemed to grow lighter. The final product was noticeably lighter and redder in colour than the unaltered powder. Two powder slides were made for the PXRD, one was a slide of the bulk powder, and the other was made from the white film covering the sides of the vessel. Amongst the many minerals matched for this experiment using the PXRD, results showed that the bulk powder contained magnetite peaks as well as patterns correlating to both pyrite and pyrrhotite peaks. Anhydrite ($CaSO_4$) was also found in this sample. As hypothesized, the results from the white film showed a strong elemental sulfur pattern. Unfortunately, the results showed no carbonate formation.

Experiment 18 was run as a variation of experiment 17; the same parameters were followed (2.5 g of RTS-3A powder, under $CO_2$ at approximately 200° C.), except that this experiment was only to be run for one hour. Once again, after approximately 10 minutes, white film followed by a yellow film around the base was seen. After approximately 20 minutes, and once the yellow colouring was quite prominent, the heat was turned off. The experiment was cooled for half an hour down to 32° C., during this time, the yellow colouring had essentially disappeared. Nearly one hour after the experiment had begun, the vessel was opened. The solution had a rather pungent odour upon the opening of the vessel. The final product was only slightly lighter and redder in colour than the unaltered powder. A sample of the bulk powder was prepared and analyzed through the PXRD. Results showed that the powder once again contained magnetite as well as both pyrrhotite and pyrite, additionally peaks for bassanite [$(CaSO_4).0.67H_2O$] were also identified. There was no carbonate formation evident from the results.

It should be noted that the unaltered RTS-3A powder as well as the reacted product of both experiments 17 and 18 contained calcium sulfates which varied in their $H_2O$ content. While the unaltered RTS-3A powder contained gypsum [$(CaSO_4).2H_2O$], after it was put under heat and $CO_2$ for one hour (experiment 18), it contained bassanite [$(CaSO_4).0.67H_2O$]. After 5 days under heat and $CO_2$, only anhydrite ($CaSO_4$) was present. It appears as though the calcium sulfates are being dehydrated throughout the length of the experiments.

Experiments 19 and 20 consisted of 1.0 g of RTS-3a powder with 10 mL 1 M NaOH solution under $CO_2$ at 50-60° C., for 24 and 72 hours respectively. The strong basic solution was substituted for plain water in order to ameliorate the effects of acid production through sulfide oxidation seen in the previous experiments, and to encourage carbonate formation (as most carbonate phases prefer a basic environment). In both experiments the mixture started a muddy brown-grey colour; within 24 hours a bright orange ring formed on the glass at the top edge of the mixture and the colour of the mixture had grown noticeably lighter; after about 48 hours the entire mixture had turned quite orange and the ring on the glass was turning red. On opening the vessel, in both experiments the measured pH was still above 8.

As the mixture was dried in air, white-to-yellow crystallites formed among the tailings material. These proved to be various sodium carbonate and bicarbonate salts which precipitate from the NaOH solution itself. This shows that the basic solution does readily absorb $CO_2$ from the air and that carbonate ions should be present in the system.

PXRD patterns of both experiments were similar and show the presence of elemental S, Fe sulfate phases (mostly melanterite $Fe(SO_4).7H_2O$), ferric oxides goethite FeOOH and ferrihydrite, and strong lines from the sodium carbonate salts. Despite the presence of carbonate in the system, there is no indication of carbonates forming with iron.

Experiment 21 was a dry experiment where 1.0 g of powdered pyrite under $CO_2$ was heated at 200-230° C. for 24 hours. This was to parallel experiments 17 and 18 where the RTS-3a tailings powder was similarly treated. In those experiments, elemental sulfur quickly formed on the side of the vessel (within 15 minutes). In experiment 21, we observed no sulfur film forming, even after 24 hours; this shows that it is pyrrhotite and not pyrite in previous experiments that releases sulfur. The pyrite powder darkened in colour slightly and on opening the vessel there was a strong pungent odour, possibly of $SO_2$. PXRD patterns showed very small peaks due to some $FeSO_4$ phase (melanterite was the best match, although there should not have been any water in the system) in addition to pyrite.

Experiment 22 was intended to repeat the same conditions as in experiments 19 and 20, 1.0 g of RTS-3a powder with 10 mL 1 M NaOH solution under $CO_2$ at 50-60° C., but for a longer time. In this experiment the temperature was not monitored with thermocouple wire, as the hotplate being using had proved to consistently heat to 50-60° C., and we hoped to avoid losing another wire to acid corrosion. After 24 hours, the mixture had turned very dark grey to black, unlike experiments 19 and 20 after the same period. After one week the mixture was still very dark, with an orange oxide ring had on the glass near the edge of the liquid. The pH measured at the end was still around 8. PXRD patterns showed largely the same set of products as in experiments 19 and 20, but with the addition of several small lines that appeared to be best matched by siderite, $FeCO_3$.

This experimental work, in particular experiments 12, 13, 14, and 22, demonstrate that carbonates can be successfully produced using the process described and claimed herein.

TABLE 2

Summary of Experiments

| Experiment | Container | Material | Mass (g) | Solution | Stirring | Gas | Temperature (° C.) | Time (h) | Products |
|---|---|---|---|---|---|---|---|---|---|
| 1 | Erlenmeyer | CPB-2 | 20 | 50 ml DI water | Yes | $CO_2$ 20 s fill | RT (24) | 120 | Fe oxyhydroxides |
| 2 | Erlenmeyer | CPB-2 | 10 | 50 ml DI water | Yes | $CO_2$ 20 s fill | RT | 120 | |
| 3 | Erlenmeyer | CPB-2 | 10 | dry | N/A | $CO_2$ 20 s fill | 150 | 48 | S |
| 4 | Erlenmeyer | CPB-2 | 10 | dry | N/A | air | 150 | 48 | S |
| 5 | Erlenmeyer | CPB-2 | 10 | 2 ml DI water | No | air | 150 | 48 | S |
| 6A | Erlenmeyer | CPB-2 on glass slide | ≤1 | dry | N/A | $CO_2$ 30 s fill | 150 | 24 | |
| 6B | Erlenmeyer | CPB-2 on glass slide | ≤1 | dry | N/A | $CO_2$ 30 s fill | 150 | 168 | |
| 7 | Erlenmeyer | pyrite crystal | | dry | N/A | $CO_2$ 30 s fill | 150 | 168 | Iridescent film on cut, polished section |
| 8 | Erlenmeyer | CPB-2 on glass slide | ≤1 | dry | N/A | $CO_2$ 30 s fill | 300 | 336 | |
| 9 | Erlenmeyer | CPB-2 | 6 | 10 ml 1% HCl | Yes | $CO_2$ 30 s fill | RT | 240 | |
| 10 | Erlenmeyer | CPB-2 | 5 | 10 ml 0.1M NaOH | Yes | $CO_2$ 30 s fill | RT | 240 | |
| 11 | Custom | CPB-2 | 5 | dry | N/A | $CO_2$ 30 s fill | 250 | 216 | S |
| 12 | Custom | CPB-2 | 2.5 | 10 ml DI water | Yes | $CO_2$ 60 s fill | 55 | 240 | $PbCO_3$, $ZnCO_3$ |
| 13 | Custom | CPB-2 | 2.5 | 10 ml 0.1M NaOH | Yes | $CO_2$ 60 s fill | 55 | 336 | $PbCO_3$, $Pb_4(CO_3)_2(SO_4)(OH)$, |
| 14 | Custom | CPB-2 | 2.5 | 10 ml DI water | Yes | $CO_2$ 60 s fill | 55 | 240 | $PbCO_3$, $Pb_4(CO_3)_2(SO_4)(OH)$, |
| 15 | Custom | pyrite powder | 2.5 | 10 ml DI water | Yes | $CO_2$ 60 s fill | 55 | 68 | $Fe(SO_4) \cdot 4H_2O$, $Fe(OH)_3$ |
| 16 | Custom | RTS-3a | 2.5 | 10 ml DI water | Yes | $CO_2$ 60 s fill | 55 | 96 | FeOOH, S |
| 17 | Custom | RTS-3a | 2.5 | dry | N/A | $CO_2$ 60 s fill | 200 | 120 | S |

TABLE 2-continued

Summary of Experiments

| Experiment | Container | Material | Mass (g) | Solution | Stirring | Gas | Temperature (° C.) | Time (h) | Products |
|---|---|---|---|---|---|---|---|---|---|
| 18 | Custom | RTS-3a | 2.5 | dry | N/A | $CO_2$ 60 s fill | max. 220 | 1 | S |
| 19 | Custom | RTS-3a | 1.0 | 10 ml 1M NaOH | Yes | $CO_2$ 60 s fill | 55 | 24 | FeOOH, S, $FeSO_4 \cdot nH_2O$, ferrihydrite, Na carbonate salts |
| 20 | Custom | RTS-3a | 1.0 | 10 ml 1M NaOH | Yes | $CO_2$ 60 s fill | 55 | 72 | FeOOH, S, $FeSO_4 \cdot nH_2O$, ferrihydrite, Na carbonate salts |
| 21 | Custom | pyrite powder | 1.0 | dry | N/A | $CO_2$ 60 s fill | 200-230 | 24 | $SO_2$ gas, $FeSO_4 \cdot nH_2O$ |
| 22 | Custom | RTS-3a | 1.0 | 10 ml 1M NaOH | Yes | $CO_2$ 60 s fill | 55* | 168 | FeOOH, S, $FeSO_4 \cdot nH_2O$, ferrihydrite, $FeCO_3$, Na carbonate salts |
| 22B | Custom | RTS-3a | 1.0 | 10 ml 1M NaOH | Yes | $CO_2$ 60 s fill | 55* | 168 | S, $FeSO_4 \cdot nH_2O$, ferrihydrite, $Fe(OH)_3$, Na carbonate salts |

Example 2

Catalysed Iron-Reduction Experiment

An experiment was carried out for demonstrating feasibility a $SO_2$ reduction process as described herein.

Briefly, the experiment used 250 mL Erlenmeyer flasks and constant stirring with magnetic stir bar. To each flask was added 0.2 g FeOOH powder and 150 mL tap water (<0.5 mg/L iron). The catalyzed flask was filled and sealed by rubber stopper with 40 mL granular activated carbon (1-2 mm grains as commonly used in water filtration), and 100 mL of $CO_2$ and $SO_2$ in equal proportion. A second flask received the gas mixture but no catalyst. A third flask was filled with water, FeOOH and catalyst to determine if, as expected, $SO_2$ was the reactant.

Measurements were taken by diluting known volumes of filtered fluid to suitable expected concentrations for testing. Concentrations were determined with colorimetric ferrous iron test strips with combined error on the order of ±10-50 mg/L. The results are presented in the Table 2 below.

TABLE 2

Results of activated carbon catalyst for $SO_2$ reduction of ferric iron.

| | $Fe^{2+}$ mg/L | | |
|---|---|---|---|
| Time (h) | Catalyzed | Not Catalyzed | Control |
| 0 | 0 | 0 | 0 |
| 2 | 100 | 25 | 0 |
| 11 | 500 | 100 | 0 |
| 108 | 1000 | 30 | 0 |

As can be appreciated from the Table 2, activated carbon clearly catalyzes this reduction reaction.

REFERENCES

Ferguson, K. D. and P. M. Erickson, 1988. Pre-Mine Prediction of Acid Mine Drainage. In: Dredged Material and Mine Tailings. Edited by Dr. Willem Salomons and Professor Dr. Ulrich Forstner. Copyright by Springer-Verlag Berlin Heidelberg 1988.

S. K. Lower, "Carbonate equilibria in natural waters," *Simon Fraser University*, vol. 544, 1999.

J. D. Rimstidt and D. J. Vaughan, "Pyrite oxidation: a state-of-the-art assessment of the reaction mechanism," *Geochimica et Cosmochimica Acta*, vol. 67, no. 5, pp. 873-880, 2003.

P. C. Singer and W. Stumm, "The solubility of ferrous iron in carbonate-bearing waters," *Journal (American Water Works Association)*, pp. 198-202, 1970.

Vigânico, E. M., Colling, A. V., de Almeida Silva, R. and Schneider, I. A. H. Biohydrometallurgical/UV production of ferrous sulphate heptahydrate crystals from pyrite present in coal tailings. *Minerals Engineering*, 24(11), pp. 1146-1148, 2011.

Headings are included herein for reference and to aid in locating certain sections. These headings are not intended to limit the scope of the concepts described therein, and these concepts may have applicability in other sections throughout the entire specification. Thus, the present invention is not intended to be limited to the embodiments shown herein but is to be accorded the widest scope consistent with the principles and novel features disclosed herein.

The singular forms "a", "an" and "the" include corresponding plural references unless the context clearly dictates otherwise. Thus, for example, reference to "a compound" includes one or more of such compound, and reference to "the method" includes reference to equivalent steps and methods known to those of ordinary skill in the art that could be modified or substituted for the methods described herein.

Unless otherwise indicated, all numbers expressing quantities of ingredients, reaction conditions, concentrations, properties, and so forth used in the specification and claims are to be understood as being modified in all instances by the term "about". At the very least, each numerical parameter should at least be construed in light of the number of reported significant digits and by applying ordinary rounding techniques. Accordingly, unless indicated to the contrary, the numerical parameters set forth in the present specification and attached claims are approximations that may vary depending upon the properties sought to be obtained. Notwithstanding that the numerical ranges and parameters setting forth the broad scope of the embodiments are approximations, the numerical values set forth in the specific examples are reported as precisely as possible. Any numerical value, however, inherently contains certain errors resulting from variations in experiments, testing measurements, statistical analyses and such.

It is understood that the examples and embodiments described herein are for illustrative purposes only and that various modifications or changes in light thereof will be suggested to persons skilled in the art and are to be included within the present invention and scope of the appended claims.

The invention claimed is:

1. A system for processing metal sulfate compounds and sequestering $CO_2$, comprising:
   an electrochemical cell producing an alkali-containing catholyte;
   a $CO_2$ absorption reactor operatively connected to said electrochemical cell and to a source of $CO_2$, said $CO_2$ absorption reactor receiving said alkali-containing catholyte and said $CO_2$ for forming an alkaline carbonate solution; and
   a vessel for receiving an acidic solution containing metal sulfate compounds and for receiving said alkaline carbonate solution, said vessel allowing precipitation of solid metal carbonate compounds.

2. The system of claim 1, wherein said alkaline carbonate compound solution comprises at least one of carbonate ions, sodium carbonate, sodium bicarbonate, potassium carbonate, calcium carbonate and mixtures thereof.

3. The system of claim 1, wherein said acidic sulfate solution comprises sulfide leachates from acid mine drainage, sulfide mine tailings and/or reacted pyrite concentrate.

4. The system of claim 1, wherein said acidic sulfate solution comprises at least one of $FeSO_4$, and $Fe(OH)_3$, and wherein said solid metal carbonate compound comprises iron carbonate.

5. The system of claim 1, wherein said electrochemical cell is selected from the group consisting of brine electrolytic cells, bipolar membrane electrodialytic (BMED) cells and electro-electrodialytic (EED) cells.

6. A method for processing aqueous metal sulfate compounds and sequestering $CO_2$, comprising:
   providing an electrochemical cell producing an alkali-containing catholyte;
   providing a $CO_2$ absorption reactor operatively connected to said electrochemical cell and to a source of $CO_2$;
   feeding said $CO_2$ absorption reactor with said alkali-containing catholyte for forming an alkaline carbonate solution; and
   reacting in a vessel an acidic sulfate solution comprising metal ions with said alkaline carbonate solution for precipitating solid metal carbonate compounds.

7. The method of claim 6, further comprising recovering said solid metal carbonate compounds.

8. The method of claim 6, further comprising a step of circulating the acidic sulfate solution through a $SO_2$ reduction reactor prior to said reacting, wherein said $SO_2$ reduction reactor reduces trivalent metal compounds present in the acidic sulfate solution to divalent metal compounds.

9. The method of claim 6, wherein said alkaline carbonate compound solution comprises at least one of carbonate ions, sodium carbonate, sodium bicarbonate, potassium carbonate, calcium carbonate and mixtures thereof.

10. The method of claim 6, wherein said acidic sulfate solution comprises sulfate compounds containing divalent metal cations and wherein precipitated solid metal carbonate compounds comprises carbonate compounds containing divalent metal.

11. The method of claim 6, wherein said acidic sulfate solution comprises at least one of $FeSO_4$, and $Fe(OH)_3$, and wherein said solid metal carbonate compound comprises iron carbonate.

12. The method of claim 6, wherein said sulfate solution comprises sulfide leachates from acid mine drainage, sulfide mine tailings and/or reacted pyrite concentrate.

13. The method of claim 6, wherein said electrochemical cell is selected from the group consisting of brine electrolytic cells, bipolar membrane electrodialytic (BMED) cells and electro-electrodialytic (EED) cells.

14. A system for reducing trivalent metal compounds to divalent metal compounds and sequestering $CO_2$, comprising:
   a $SO_2$ reduction reactor operatively connected to a source of $CO_2$ and $SO_2$ gas, and to a source of trivalent metal compounds, said $SO_2$ reduction reactor reducing trivalent metal compounds to produce a solution comprising divalent metal compounds;
   an electrochemical cell producing an alkali-containing catholyte;
   a $CO_2$ absorption reactor operatively connected to said electrochemical cell and to the $SO_2$ catalytic reduction reactor, said $CO_2$ absorption reactor receiving said alkali-containing catholyte from the electrochemical cell and $CO_2$ from the $SO_2$ reduction reactor for forming an alkaline carbonate solution; and
   a vessel for receiving said alkaline carbonate solution and for receiving said solution comprising divalent metal compounds, said vessel allowing precipitation of solid divalent metal carbonate compounds.

15. The system of claim 14, wherein the trivalent metal compounds contain trivalent (ferric) iron and wherein in the $SO_2$ catalytic reduction column $SO_2$ reacts with said trivalent (ferric) iron to produce divalent (ferrous) iron in a sulfate form.

16. The system of claim 14, wherein the trivalent metal compounds comprises at least one of $Fe(OH)_3$ or $Fe_2(SO_4)_3$, and wherein said solid metal carbonate compound comprises $FeCO_3$.

17. The system of claim 14, wherein the trivalent metal compounds comprises sulfide leachates from acid mine drainage, sulfide mine tailings and/or reacted pyrite concentrate.

18. The system of claim 14, wherein the $SO_2$ reduction reactor comprises a catalyst selected from the group consisting of platinum, activated carbon, ruthenium, rhodium, and vanadium pentoxide.

19. The system of claim 14, wherein said electrochemical cell is selected from the group consisting of brine electrolytic cells, bipolar membrane electrodialytic (BMED) cells and electro-electrodialytic (EED) cells.

20. A method for reducing trivalent metal compounds to divalent metal compounds and sequestering $CO_2$, comprising:
   reducing trivalent metal compounds into a $SO_2$ reduction reactor to obtain an acidic sulfate solution comprising divalent metal compounds;

providing an electrochemical cell producing an alkali-containing catholyte;

circulating said alkali-containing catholyte into a $CO_2$ absorption reactor operatively connected to said electrochemical cell for forming an alkaline carbonate solution; and reacting in a vessel said acidic sulfate solution with said alkaline carbonate solution for precipitating solid carbonate compounds containing divalent metal.

21. The method of claim 20, wherein the trivalent metal compounds contain trivalent (ferric) iron and wherein in the $SO_2$ catalytic reduction column $SO_2$ reacts with said trivalent (ferric) iron to produce divalent (ferrous) iron in a sulfate form.

22. The method of claim 20, wherein the trivalent metal compounds comprises at least one of $Fe(OH)_3$ or $Fe_2(SO_4)_3$, wherein said solid metal carbonate compound comprises $FeCO_3$.

23. The method of claim 20, wherein the trivalent metal compounds comprises sulfide leachates from acid mine drainage, sulfide mine tailings and/or reacted pyrite concentrate.

24. The method of claim 20, wherein the $SO_2$ reduction reactor comprises a catalyst selected from the group consisting of platinum, activated carbon, ruthenium, rhodium, and vanadium pentoxide.

25. The method of claim 20, wherein said electrochemical cell is selected from the group consisting of brine electrolytic cells, bipolar membrane electrodialytic (BMED) cells and electro-electrodialytic (EED) cells.

* * * * *